US010187577B2

(12) United States Patent
Choi et al.

(10) Patent No.: US 10,187,577 B2
(45) Date of Patent: Jan. 22, 2019

(54) MOBILE DEVICE AND METHOD OF CONTROLLING THEREFOR

(71) Applicant: LG ELECTRONICS INC., Seoul (KR)

(72) Inventors: Jaeho Choi, Seoul (KR); Hojae Jung, Seoul (KR); Jisun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 15/007,917

(22) Filed: Jan. 27, 2016

(65) Prior Publication Data

US 2017/0064205 A1    Mar. 2, 2017

(30) Foreign Application Priority Data

Sep. 1, 2015 (KR) .................. 10-2015-0123481

(51) Int. Cl.
| | | |
|---|---|---|
| *H04N 5/232* | (2006.01) | |
| *H04N 5/225* | (2006.01) | |
| *H04B 1/3827* | (2015.01) | |
| *H04W 4/02* | (2018.01) | |
| *H04W 4/12* | (2009.01) | |

(52) U.S. Cl.
CPC ....... *H04N 5/23293* (2013.01); *H04B 1/3833* (2013.01); *H04N 5/225* (2013.01); *H04N 5/23216* (2013.01); *H04N 5/23222* (2013.01); *H04W 4/023* (2013.01); *H04W 4/12* (2013.01); *H04N 5/23206* (2013.01); *H04N 5/23225* (2013.01)

(58) Field of Classification Search
CPC ........... H04N 5/23293; H04N 5/23222; H04N 5/23216; H04N 5/225; H04N 5/23225; H04N 5/23206; H04W 4/12; H04W 4/023; H04B 1/3833
See application file for complete search history.

(56) References Cited

U.S. PATENT DOCUMENTS

| | | | |
|---|---|---|---|
| 2006/0187230 A1* | 8/2006 | Jung | .................. H04N 5/23206 |
| | | | 345/581 |
| 2007/0171282 A1 | 7/2007 | Yanagi | |
| 2008/0050111 A1* | 2/2008 | Lee | ........................ G03B 19/00 |
| | | | 396/429 |
| 2009/0322893 A1 | 12/2009 | Stallings et al. | |
| 2011/0058052 A1 | 3/2011 | Bolton et al. | |
| 2011/0267492 A1 | 11/2011 | Prentice et al. | |

(Continued)

*Primary Examiner* — Hung Lam
(74) *Attorney, Agent, or Firm* — Birch, Stewart, Kolasch & Birch, LLP

(57) ABSTRACT

A mobile device including a camera; a memory; a wireless communication processor; a display configured to display a preview captured by the camera and at least one or more selectable options; and a controller configured to change at least one or more factors among camera setting information according to a selected specific option from the at least one or more selectable options with reference to the memory, store a specific preview captured based on the changed factor in the memory, and transmit image data corresponding to the specific preview and the camera setting information used for capturing the specific preview via the wireless communication processor to an external mobile device in response to reception of a command for sharing the specific preview stored in the memory.

20 Claims, 24 Drawing Sheets

(56) References Cited

U.S. PATENT DOCUMENTS

| | | |
|---|---|---|
| 2013/0076918 A1 | 3/2013 | Park et al. |
| 2013/0329111 A1 | 12/2013 | Desai et al. |
| 2015/0189164 A1 | 7/2015 | Kim et al. |
| 2015/0189171 A1 | 7/2015 | Yim et al. |
| 2016/0035074 A1* | 2/2016 | Jeong ................ G06T 11/60 382/282 |

* cited by examiner

MOBILE DEVICE AND METHOD OF CONTROLLING THEREFOR

CROSS-REFERENCE TO RELATED APPLICATIONS

Pursuant to 35 U.S.C. § 119(a), this application claims the benefit of the Korean Patent Application No. 10-2015-0123481, filed on Sep. 1, 2015, which is hereby incorporated by reference as if fully set forth herein.

BACKGROUND OF THE INVENTION

Field of the Invention

The present invention relates to a mobile device and a method of controlling therefor. More particularly, the present invention is related to a mobile device including a camera.

Discussion of the Related Art

Recently, a mobile device (e.g., a mobile phone, a tablet PC, a wearable device, etc.) includes various functions including a camera function. In particular, the capability of the camera mounted on the mobile device is consistently improving. However, the related art mobile device has the following technical problems.

First of all, the related art mobile device does not easily induce a user to use a camera function of high performance. Secondly, the related art mobile terminal does not provide a user with simple options for capturing a picture similar to a picture taken by a professional. Thirdly, the related art mobile terminal does not provide a user with a solution capable of easily sharing information on a picture captured by a specific camera setting condition with other users.

SUMMARY OF THE INVENTION

Accordingly, one object of the present invention is directed to an apparatus and method thereof that substantially obviate one or more problems due to limitations and disadvantages of the related art.

Another object of the present invention is to provide a user with a technology capable of easily accessing a camera function of high performance.

Still another object of the present invention is to implement simple options for capturing a picture similar to a picture taken by a professional using various GUIs.

Another object of the present invention is to provide a user with a solution capable of more promptly sharing information on a picture captured by a specific camera setting condition with other users.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of controlling a mobile device includes the steps of displaying a preview captured by a camera and at least one or more selectable options, selecting a specific option from the at least one or more selectable options, automatically changing at least one or more factors among camera setting information according to the selected specific option with reference to a memory, storing a specific preview captured based on the changed factor in the memory and transmitting image data corresponding to the specific preview and camera setting information used for capturing the specific preview to an external mobile device in response to reception of a command for sharing the specific preview stored in the memory.

To further achieve these objects and other advantages and in accordance with the purpose of the invention, as embodied and broadly described herein, according to one embodiment, a mobile device according to one embodiment of the present invention includes a camera, a memory, a communication module, a display module configured to display a preview captured by the camera and at least one or more selectable options, an interface module configured to select a specific option from the at least one or more selectable options and a controller configured to control the camera, the memory, the communication module, the display module and the interface module. In this instance, the controller is configured to automatically change at least one or more factors among camera setting information according to the selected specific option with reference to the memory, configured to store a specific preview captured based on the changed factor in the memory, and configured to control the communication module to transmit image data corresponding to the specific preview and camera setting information used for capturing the specific preview to an external mobile device in response to reception of a command for sharing the specific preview stored in the memory.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
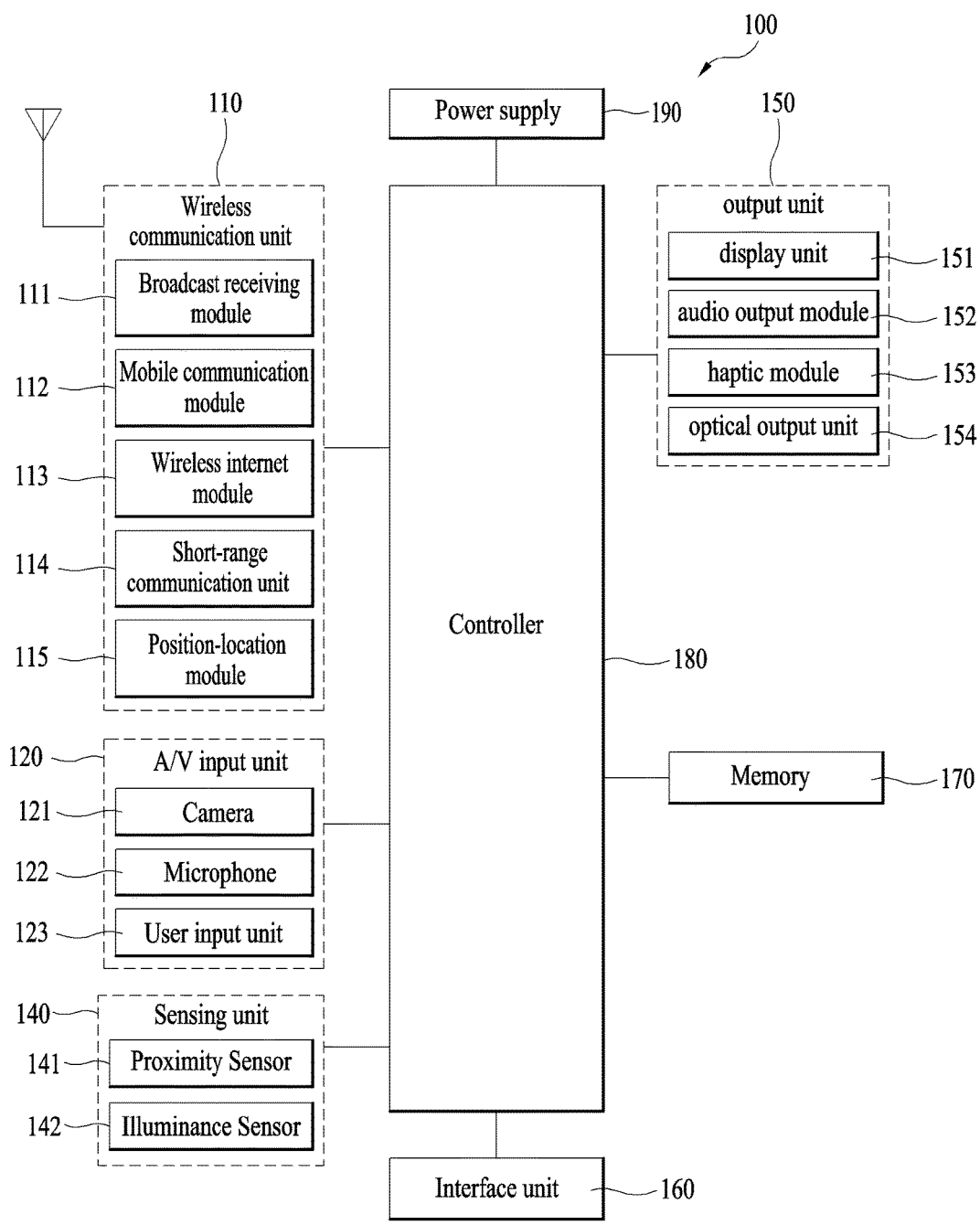
FIG. 1A is a block diagram of a mobile terminal in accordance with the present disclosure.
Figure 1B:
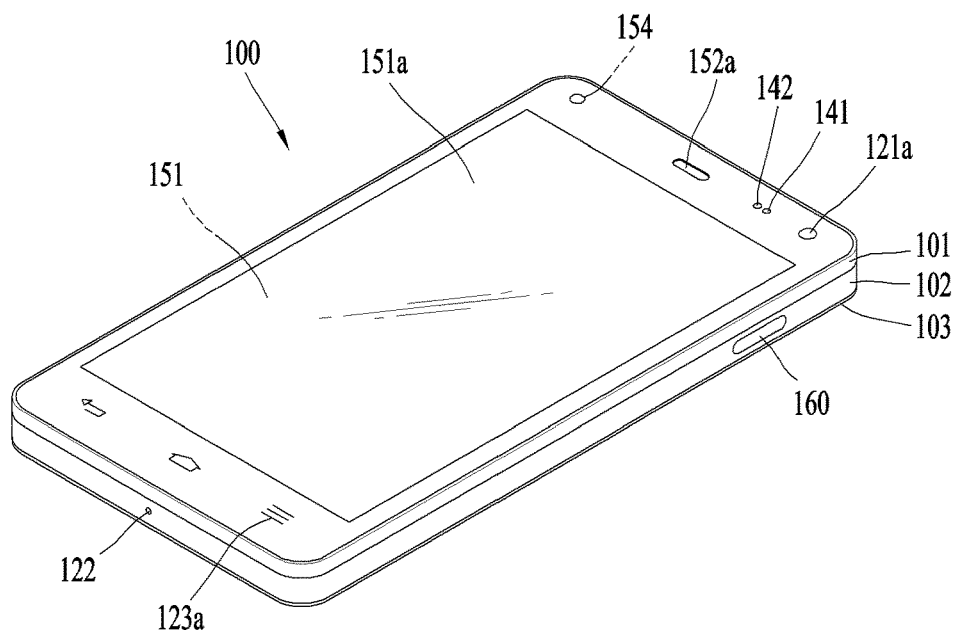
FIGS. 1B and 1C are conceptual views of one example of the mobile terminal, viewed from different directions.
Figure 1C:
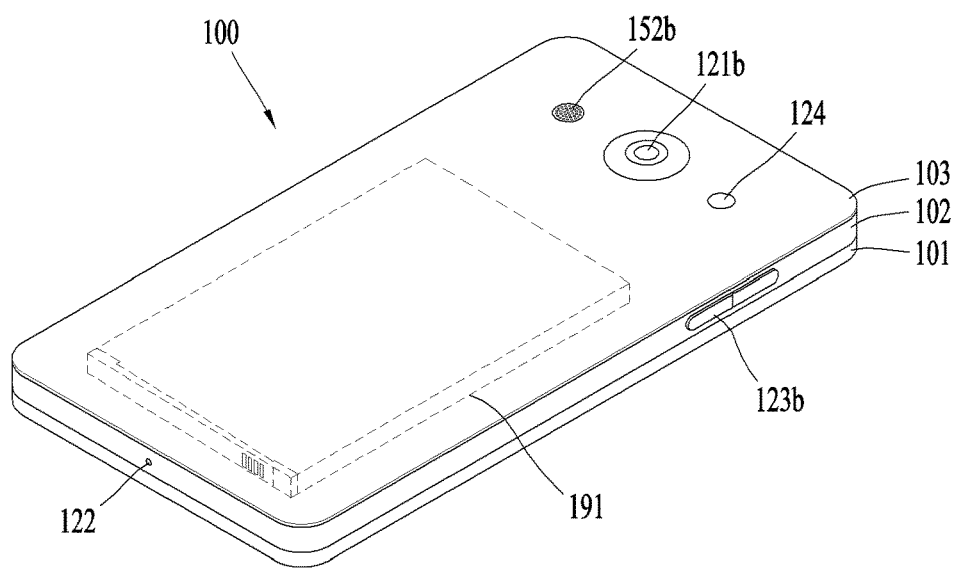

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

A system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112. The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port.

In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user gabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
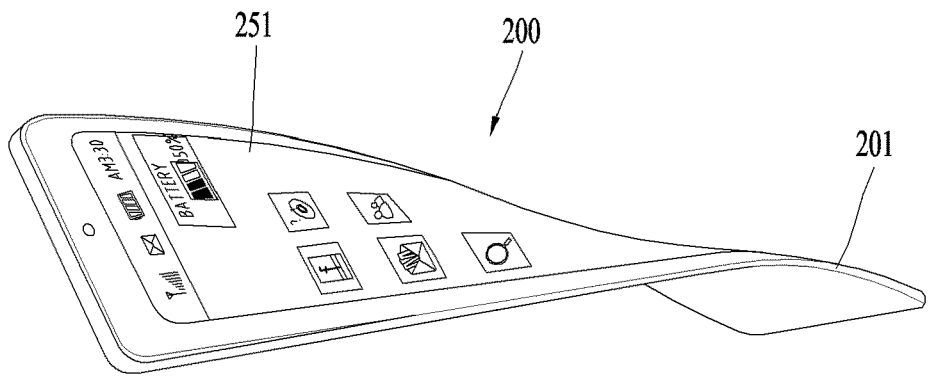
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140. The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor. The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells. The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
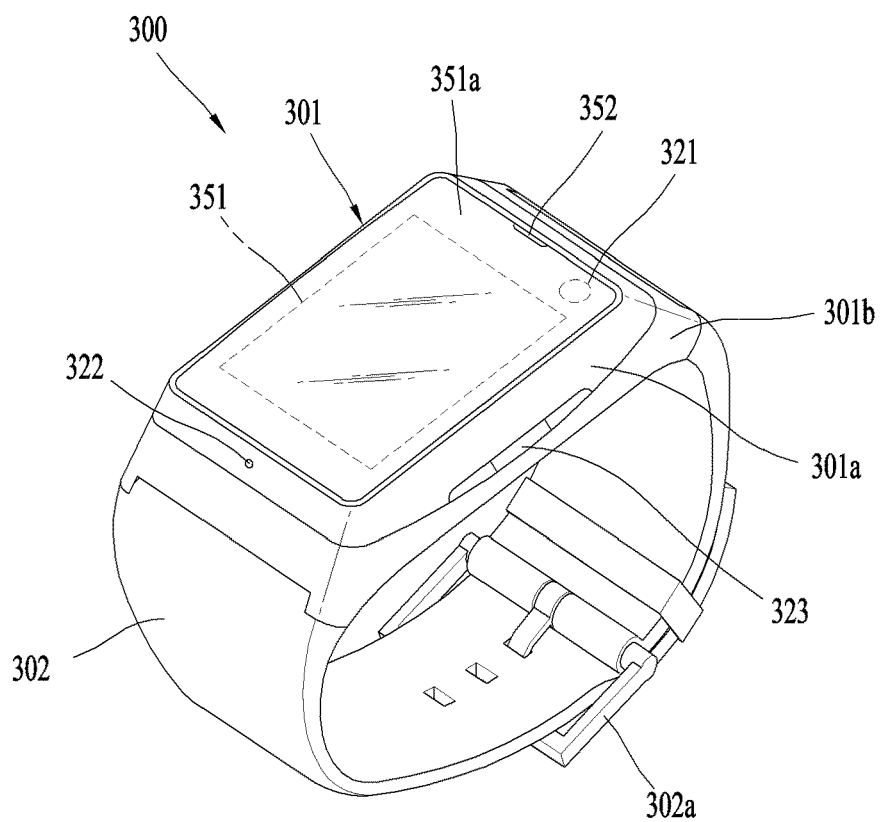
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
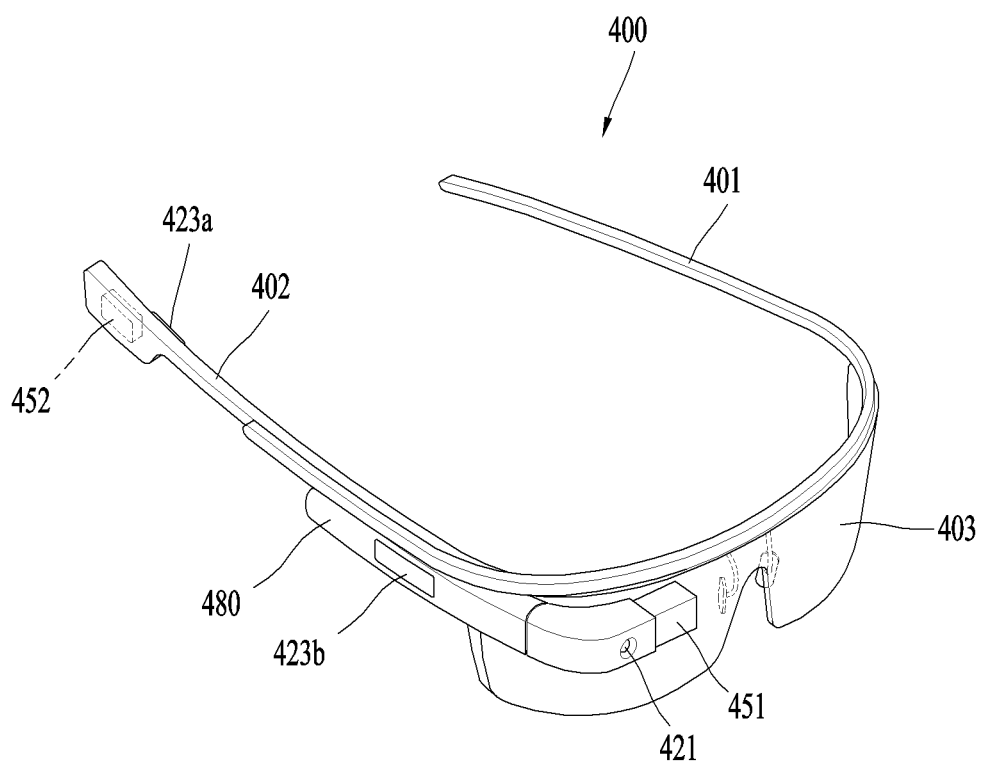
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user. In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT. Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

In addition, although the embodiments of the present invention are explained with an example for a mobile terminal 100 shown in FIGS. 1A to 1C, the mobile terminal may correspond to the mobile terminal 200 of FIG. 2, the mobile terminal 300 of FIG. 3 and the mobile terminal 400 of FIG. 4. Moreover, the mobile terminal described in the present specification also corresponds to a mobile device.

In the following, a solution for guiding a camera setting enabling a user to more easily use a camera professional mode is explained with reference to FIG. 5 to FIG. 43. For example, a professional recommendation mode can be provided to the user through analysis of a captured picture, provision of a high class template, analysis of a location information value and the like.

As mentioned in the foregoing description, according to a related art, a user does not know high-performance functions of a camera at all or is unable to properly utilize the functions. For example, although a normal user wants to capture a nice picture, it is difficult for the user to expect a picture preferred by the user by operating a capturing setting and it is necessary for the user to separately learn a technique of direction to take a nice picture.

However, according to embodiments of the present invention described in the following, the mobile terminal provides a user with a guide of a more advanced capturing technique by analyzing a capturing setting value and can add or edit a frequently used camera mode according to a user. Further, the camera capturing speed is enhanced and an optimized camera mode is provided according to a user by omitting a process for a user to manually operate a camera detail setting.

Figure 5:
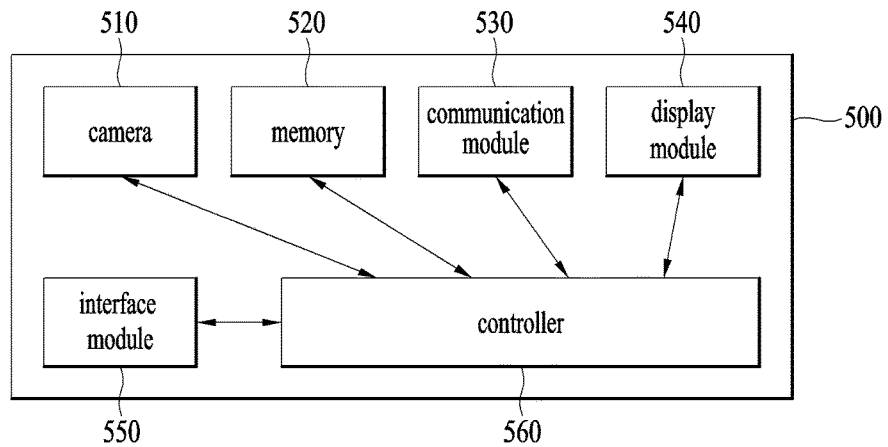
FIG. 5 is a schematic block diagram illustrating main configuration elements of a mobile device according to one embodiment of the present invention.

FIG. 5 is a schematic block diagram illustrating a mobile device according to one embodiment of the present invention. Further, FIG. 5 can be complementarily interpreted with reference to the previously explained FIG. 1 to FIG. 4. As shown in FIG. 5, a mobile device 500 includes a camera 510, a memory 520, a communication module 530, a display module 540, an interface module 550, a controller 560 and the like.

The display module 540 displays a preview captured by the camera 510 and at least one or more selectable options and the interface module 550 selects a specific option from the at least one or more selectable options. For example, the interface module 550 corresponds to a touch interface.

The controller 560 is configured to control the camera 510, the memory 520, the communication module 530, the display module 540 and the interface module 550. In particular, the controller is configured to automatically change at least one factor among camera setting information according to the selected specific option with reference to the memory 520, store a specific preview, which is captured based on the changed factor, in the memory 520, control the communication module 530 in response to reception of a command for sharing the specific preview stored in the memory 520. By doing so, both an image data corresponding to the specific preview and the camera setting information used for capturing the specific preview can be transmitted to an external mobile device.

If a first specific option is selected, the controller 560 is configured to change at least one factor among the camera setting information according to at least one of information on a location at which the mobile device is located and weather information. The controller is configured to display a first preview captured based on original camera setting information and a second preview captured based on the changed factor. This will be described later in more detail with reference to FIG. 12 and FIG. 13.

The controller 560 is configured to search for a picture of a professional, which is captured by a factor belonging to a predetermined range of the changed factor, in an internal memory or an external memory and display the searched picture of the professional. This will be described later in more detail with reference to FIG. 14 and FIG. 15.

If a second specific option is selected, the controller 560 is configured to display at least one or more templates stored in the memory 520, change at least one factor among the camera setting information according to additional information corresponding to a selected specific template and display a first preview captured based on original camera setting information and a second preview captured based on the changed factor. This will be described later in more detail with reference to FIG. 16 to FIG. 19. For example, the template is stored in the memory 520 in advance and the template corresponds to an image data which is captured according to a user selection.

The controller 560 is configured to additionally provide an option for enabling the external mobile device to execute a camera. For example, the option can be transmitted to the external device through one selected from the group consisting of e-mail, SNS (social network service) and a text message. This will be described later in more detail with reference to FIG. 25 to FIG. 29.

The controller 560 is configured to display a different option according to a location of the mobile device. For example, if the mobile device 500 is located at the inside of a building, the controller is configured to display a first option and a second option. If the mobile device 500 is located at the outside of a building, the controller is configured to display a third option and a fourth option. In this instance, at least one of the first option and the second option are different from the third option and the fourth option. In particular, the controller 560 is configured to determine whether the mobile device 500 is located at the inside or the outside of a building based on whether or not a GPS (global positioning system) signal is received. This will be described later in more detail with reference to FIG. 39 to FIG. 43.

Figure 6:
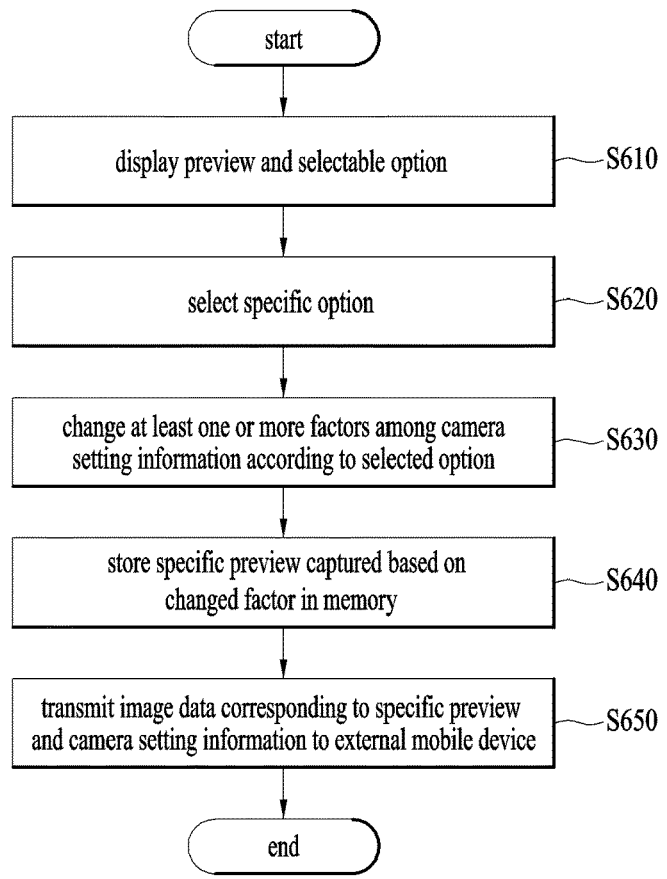
FIG. 6 is a flowchart illustrating a method of controlling a mobile device according to one embodiment of the present invention.

Next, FIG. 6 is a flowchart for a method of controlling a mobile device according to one embodiment of the present invention. Those skilled in the art can complementarily interpret FIG. 6 with reference to previously explained FIG. 1 to FIG. 5 (especially FIG. 5).

As shown, the mobile device according to one embodiment of the present invention displays a preview captured by a camera and at least one or more selectable options (S610) and selects a specific option from the at least one or more selectable options (S620). Subsequently, the mobile device automatically changes at least one factor among camera setting information according to the selected specific option (S630) and stores a specific preview captured based on the changed factor in the memory (S640).

Subsequently, the mobile device is configured to transmit an image data corresponding to the specific preview and camera setting information used for capturing the specific preview to an external mobile device in response to reception of a command for sharing the specific preview stored in the memory (S650).

Figure 7:
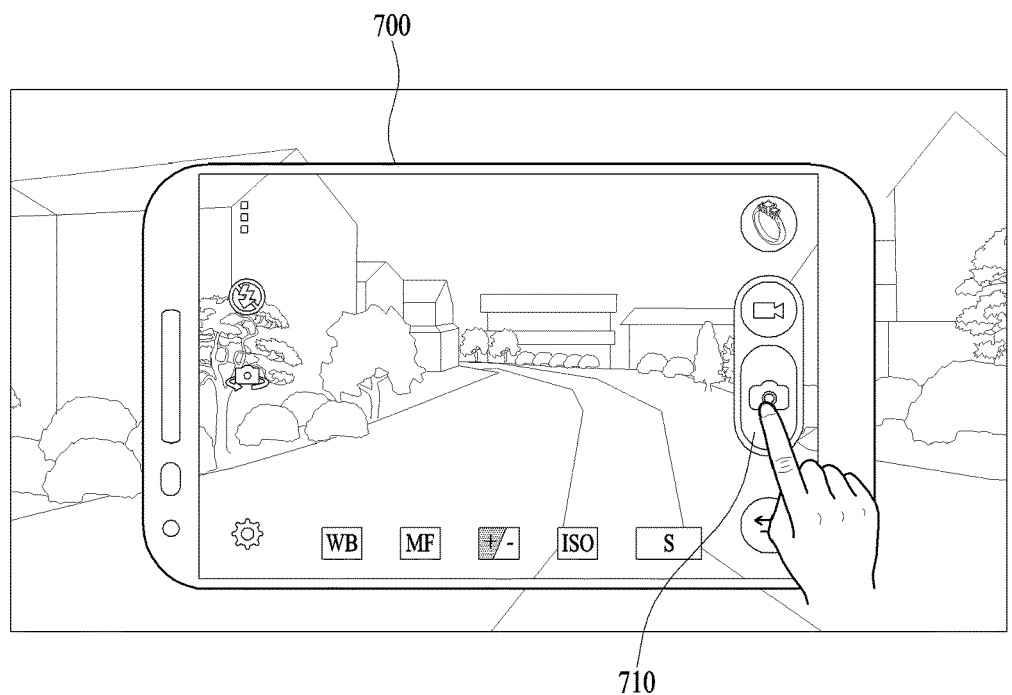
FIGS. 7 to 9 are diagrams illustrating three options provided by a mobile device according to one embodiment of the present invention.
Figure 8:
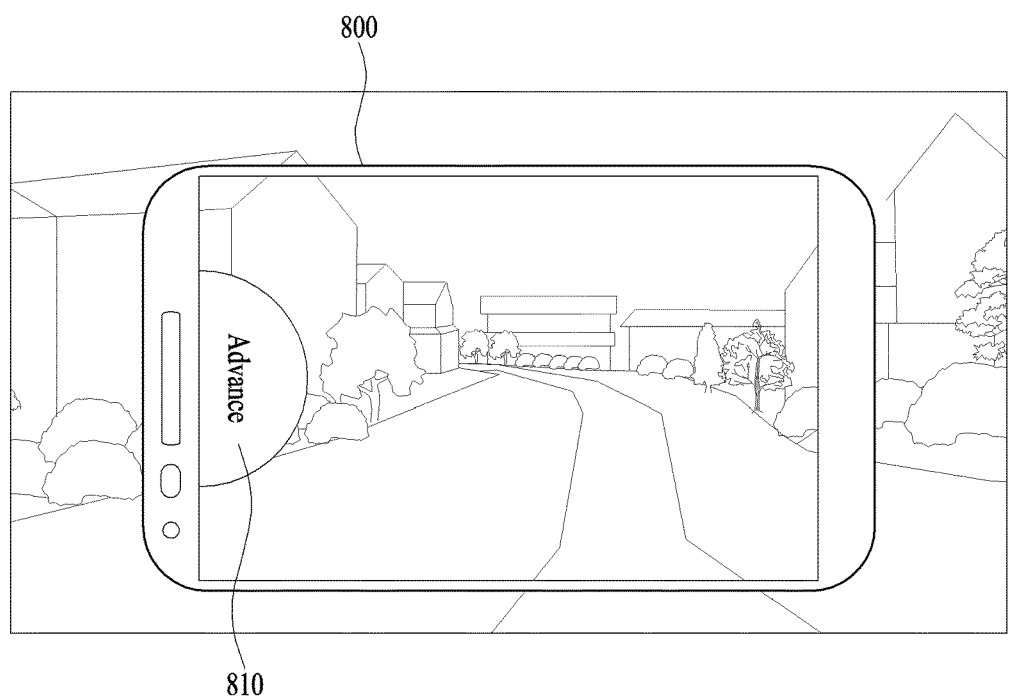
Figure 9:
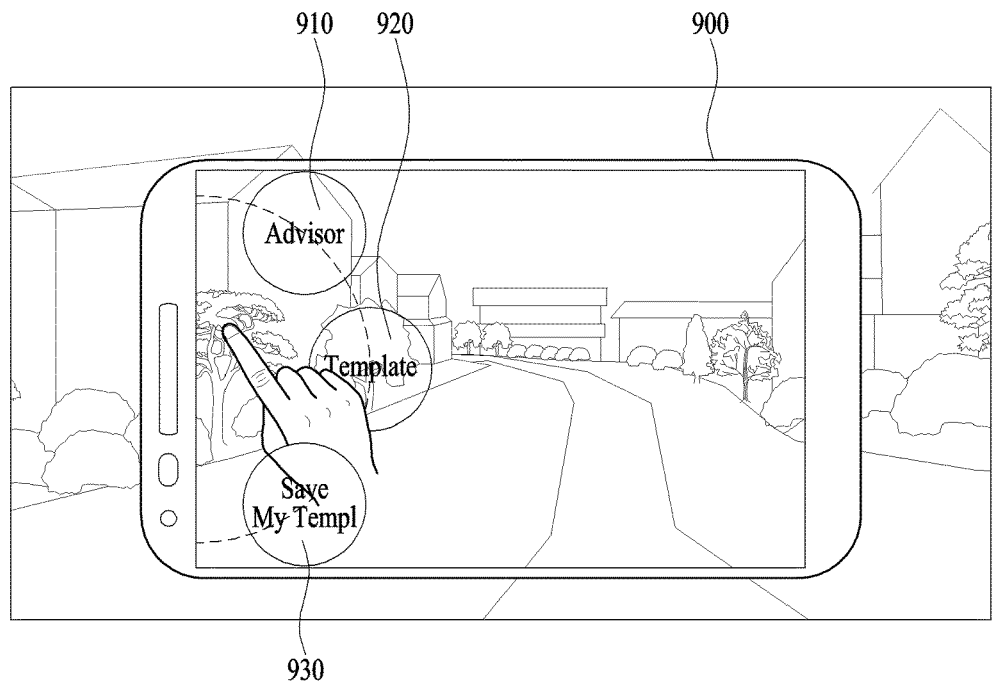

FIGS. 7 to 9 are diagrams illustrating three options provided by a mobile device according to one embodiment of the present invention. As shown in FIG. 7, if a user touches a specific button 710 after a mobile device 700 executes a camera function, the controller can store a picture which is captured according to currently configured camera setting information only. Yet, according to one embodiment of the present invention, as shown in FIG. 8, a mobile device 800 displays an advance button 810 together with a preview. Of course, in order to display the advance button 810, it is necessary to assume that a user has selected "professional mode" in advance. Yet, it is not mandatory that the present invention always assumes the "professional mode" configuration. Moreover, as shown in FIG. 7, if the specific button 710 is touched to capture a picture, the advance button 810 shown in FIG. 8 should be provided. This configuration can also belong to the scope of the present invention.

If the advance button 810 shown in FIG. 8 is touched, as shown in FIG. 9, a mobile device 900 provide a user with a first option 910, a second option 920 and a third option 930. The first option 910 is explained in detail in FIG. 10 to FIG. 15, the second option 920 is explained in detail in FIG. 16 to FIG. 19 and the third option 930 is explained in detail in FIG. 20 to FIG. 24 in the following.

Figure 10:
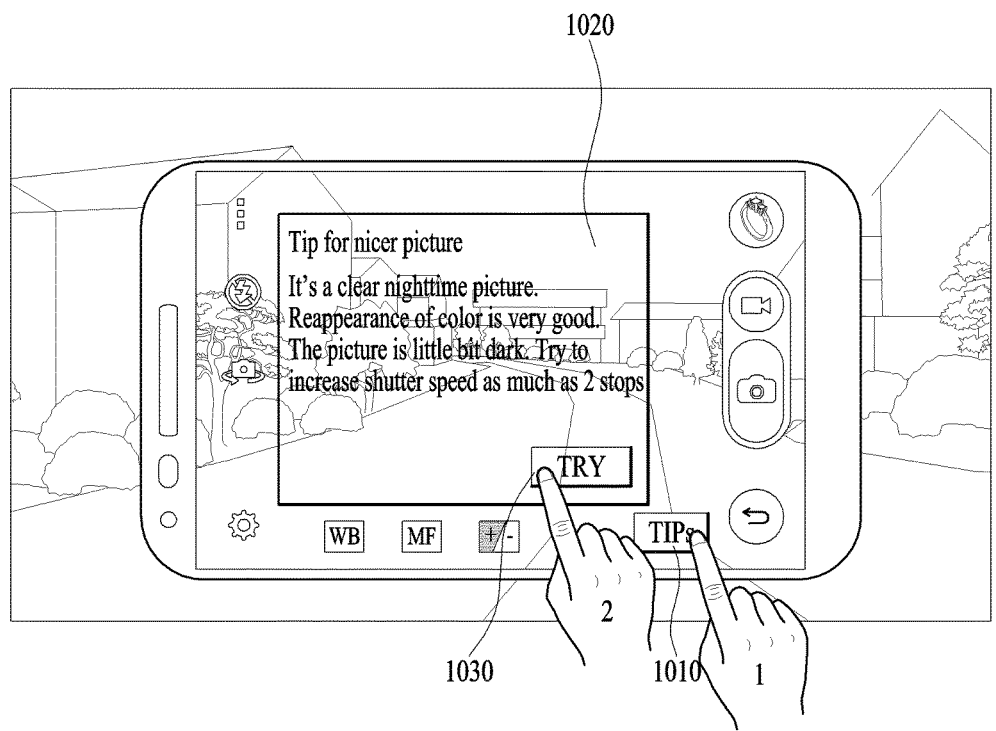
FIGS. 10 and 11 are diagrams illustrating an example of a first option provided by a mobile device according to one embodiment of the present invention.
Figure 11:
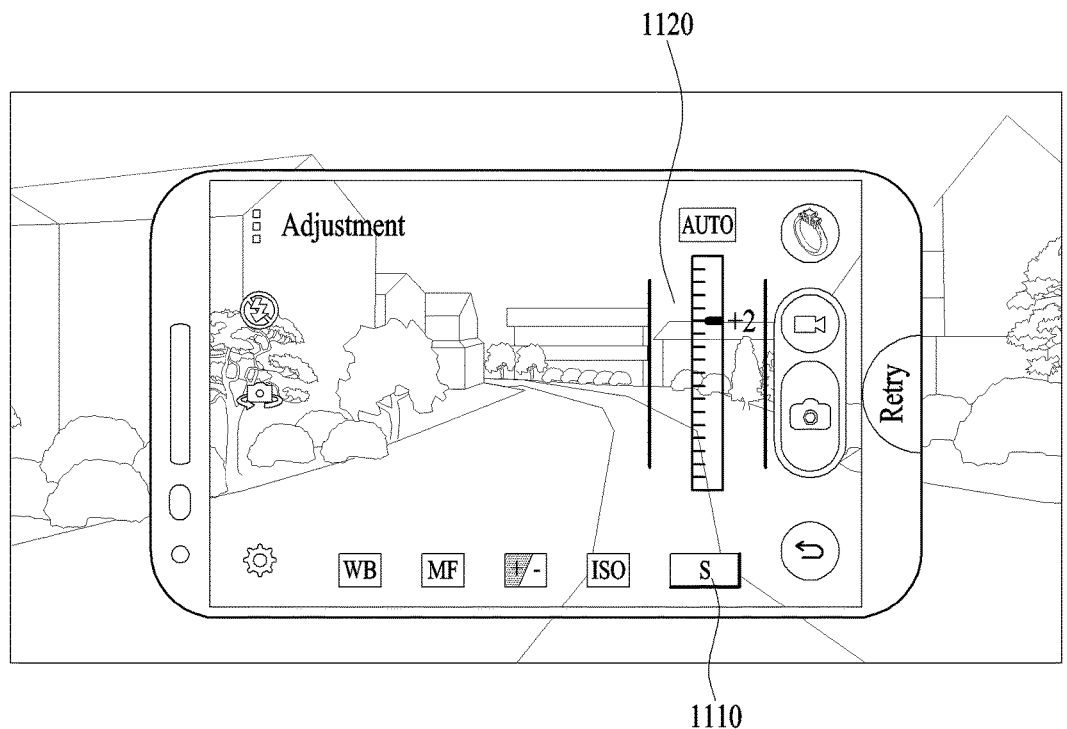

FIGS. 10 and 11 are diagrams illustrating an example of a first option provided by a mobile device according to one embodiment of the present invention. If the first option 910 shown in FIG. 9 is selected (touched), the mobile device analyzes current environment and as shown in FIG. 10, the mobile device displays a message 1020 for guiding camera setting information optimized for the analyzed environment. Of course, it can configure the message 1020 to be displayed only when a specific button 1010 is touched. Moreover, if a user, who wants to capture a picture according to the message 1020, touches a different specific button 1030, as shown in FIG. 11, automatically changed camera setting information 1120 is displayed by being highlighted. Hence, it is not necessary for the user to manually change the camera setting information.

Figure 12:
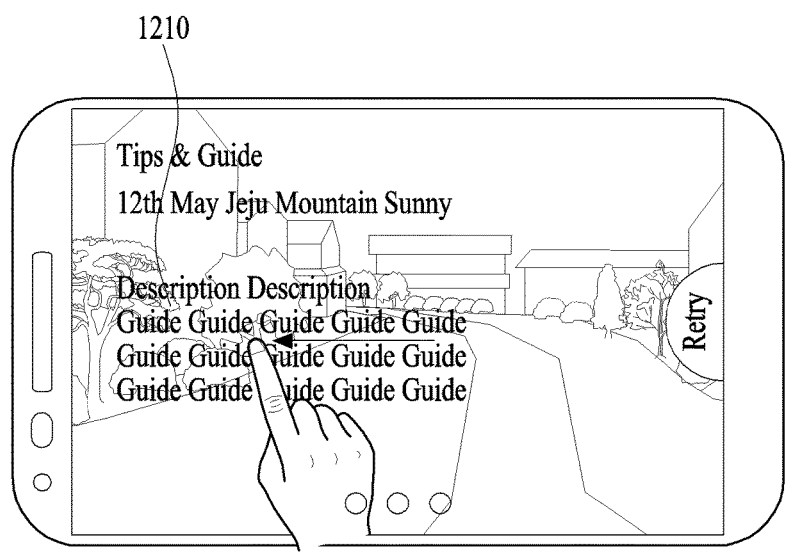
FIGS. 12 and 13 are diagrams illustrating a different example of a first option provided by a mobile device according to one embodiment of the present invention.
Figure 13:
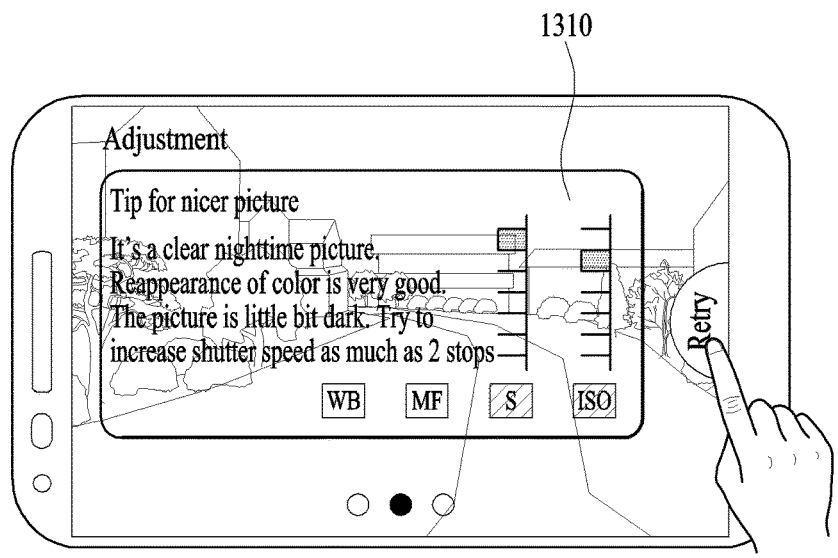
Figure 14:
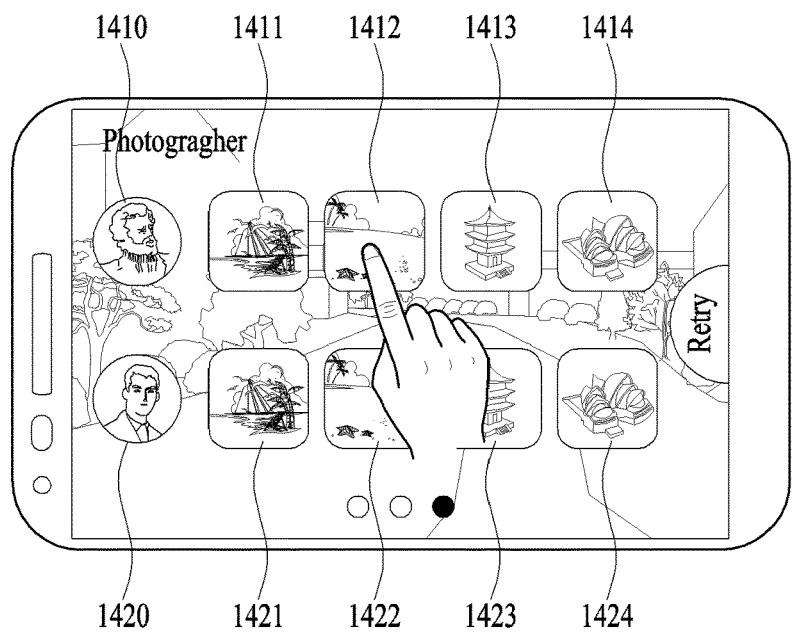
FIGS. 14 and 15 are diagrams illustrating a further different example of a first option provided by a mobile device according to one embodiment of the present invention.
Figure 15:
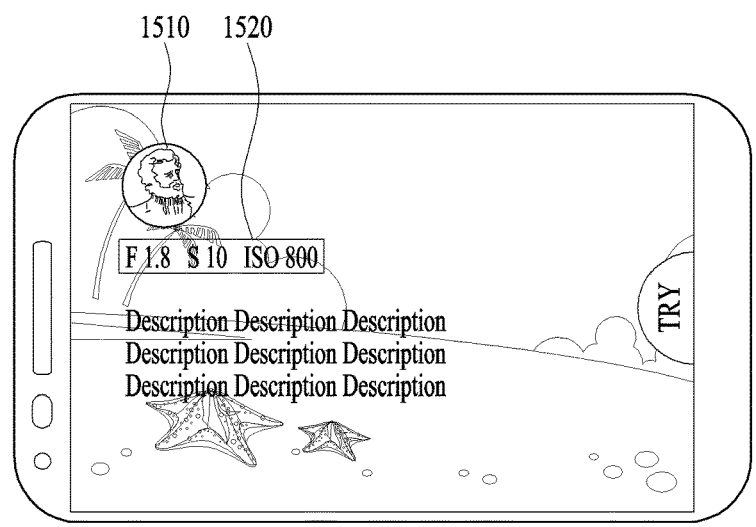

FIGS. 12 and 13 are diagrams illustrating a different example of a first option provided by a mobile device according to one embodiment of the present invention. FIGS. 14 and 15 are diagrams illustrating a further different example of a first option provided by a mobile device according to one embodiment of the present invention.

If the first option 910 shown in FIG. 9 is selected (touched), the mobile device selectively provide a user with one selected from the group consisting of a first function (tips and guide) shown in FIG. 12, a second function (adjustment) shown in FIG. 13 and a third function (photographer) shown in FIG. 14 and FIG. 15.

First of all, the first function is explained. As shown in FIG. 12, the mobile device analyzes information on a location at which the mobile device is currently located and environment information and identifies capturing subject information by analyzing an image in a preview. Subsequently, the mobile device displays a message 1210 for guiding optimized camera setting information via information recognized from weather information, information recognized by an illumination sensor, and information recognized by a temperature and humidity sensor. In this instance, a user can capture an image on a preview using the optimized camera setting information by simply touching a retry button shown in FIG. 12. For example, if the mobile device shown in FIG. 12 is located at a national park, the mobile device displays at least one selected from the group consisting of a message for recommending a wide angle mode configuration, a message for recommending a change of an ISO value after brightness and humidity information are identified through an illumination sensor and a temperature and humidity information, and a message for guiding a tip of using a flash after a message or a picture is analyzed and it is determined as a backlight.

Subsequently, the second function is explained. As shown in FIG. 13, the mobile device displays a message 1310 for comparing original camera setting information of a currently captured picture with the optimized camera setting information automatically recognized by a camera mentioned earlier in FIG. 12.

A user can check an image change in real time by operating a controller in a message 1310 shown in FIG. 13. If the user touches a retry button, the controller can reenter a capturing mode based on finally adjusted camera setting information. Moreover, outputting both a picture captured by the original camera setting information and a picture captured by the optimized setting value on a single screen at the same time also belongs to the scope of the present invention.

Lastly, the third function is explained. As shown in FIG. 14, the mobile device analyzes a location and environment and displays a picture of a professional taken in environment similar to the environment analyzed by the mobile device. For example, if information indicating that a plurality of pictures are taken by a specific first professional photographer 1410 at a location at which the mobile device is currently located is stored in an internal memory or an external memory, the mobile device displays samples 1411/1412/1413/1414 of the pictures taken by the specific first professional photographer 1410.

Meanwhile, if a specific second professional photographer 1420 mainly capturing a black and white picture or a dark picture is recommended based on information on environment in which the mobile device is currently located or weather information, the mobile device displays samples 1421/1422/1423/1424 of pictures taken by the second specific professional photographer 1420.

If a specific professional photographer or a picture sample shown in FIG. 14 is selected, as shown in FIG. 15 (in this instance, assume that the first professional photographer 1410 shown in FIG. 14 is selected), a message for guiding camera setting information 1520 mainly used by the specific professional photographer 1510 is output. If a try button shown in FIG. 15 is touched, setting information is automatically changed according to the camera setting information mainly used by the specific professional photographer 1510 and a camera capturing mode is initiated.

Figure 16:
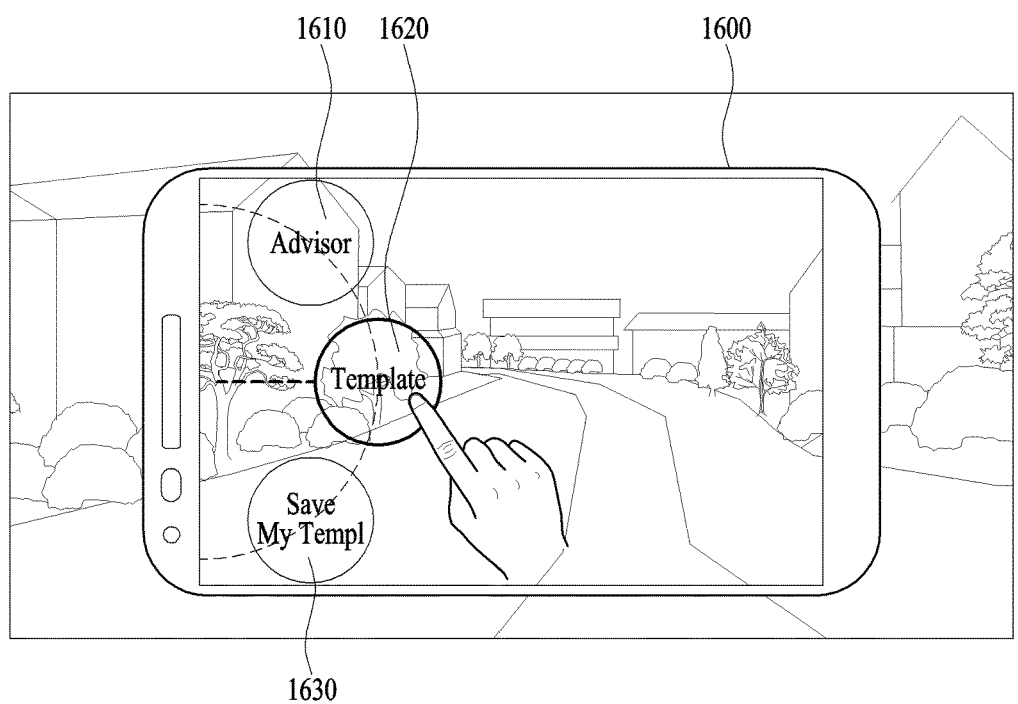
FIGS. 16 and 17 are diagrams illustrating an example of a second option provided by a mobile device according to one embodiment of the present invention.
Figure 17:
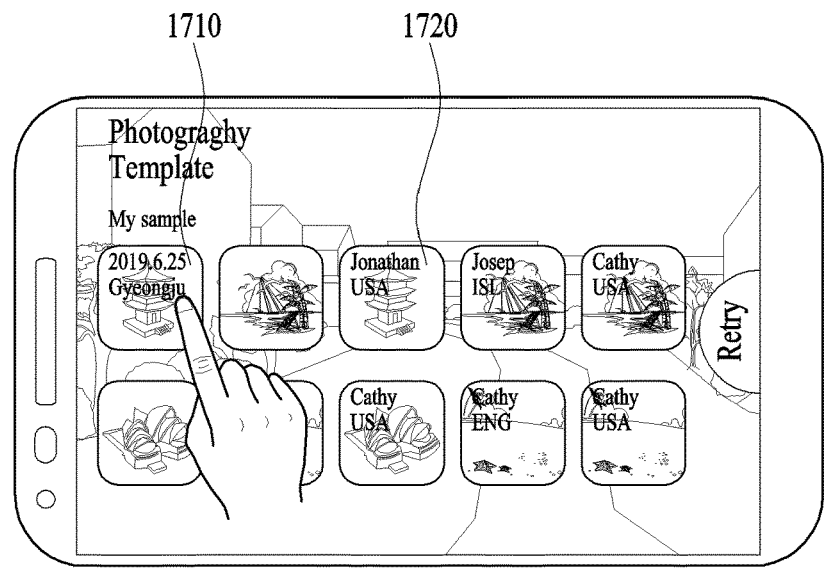

FIGS. 16 and 17 are diagrams illustrating an example of a second option provided by a mobile device according to one embodiment of the present invention. A template described in the following corresponds to an image including camera setting information. The image is designated to automatically change a capturing setting value when a picture is captured in a professional mode. According to one embodiment of the present invention, it can select a template and separately manage a template.

As shown in FIG. 16, if a user of a mobile device 1600 selects a second option 1620 from 3 options 1610/1620/1630, it changes to a screen shown in FIG. 17. Information on a photographer can be displayed on a template shown in FIG. 17. In this instance, a first template 1710 corresponds to an image captured by a user and a second template 1720 corresponds to an image captured by a different person. Hence, the user can promptly change camera setting information by simply selecting a template without separately changing the camera setting information to take a picture of a style preferred by the user.

Figure 18:
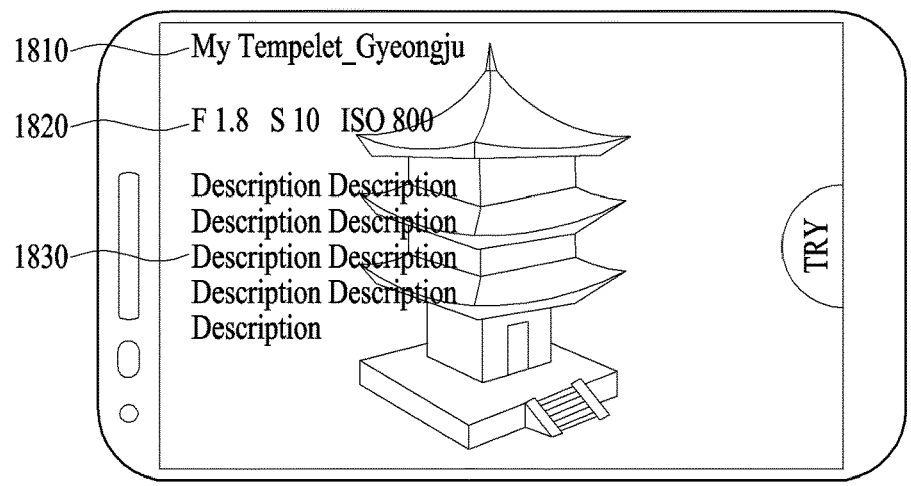
FIGS. 18 and 19 are diagrams illustrating a different example of a second option provided by a mobile device according to one embodiment of the present invention.
Figure 19:
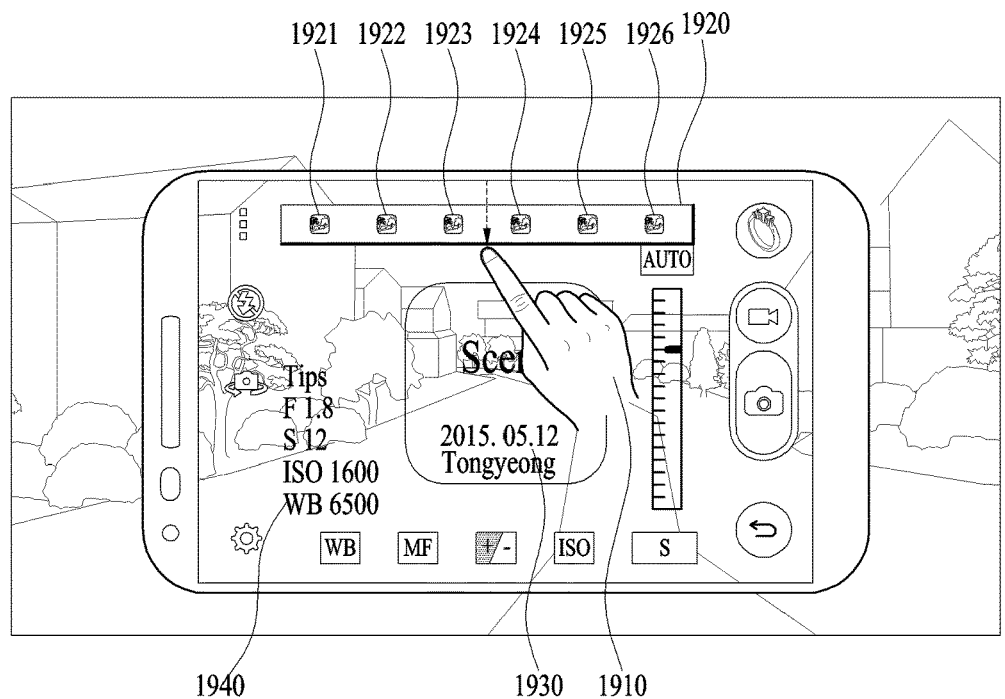

FIGS. 18 and 19 are diagrams illustrating a different example of a second option provided by a mobile device according to one embodiment of the present invention. If a random template is selected from the templates shown in FIG. 17, as shown in FIG. 18, basic information 1810 of the template, camera setting information 1820 of the template and a guide message 1830 are displayed.

For instance, the basic information 1810 includes information on a location at which the template is captured or a title, the camera setting information 1820 includes an aperture value (F), a shutter value (S) and an ISO value. And, for example, the guide message 1830 includes a guide message such as "Take a picture by increasing resolution of a camera and reducing shutter speed at night. You can take a picture by making a trajectory of light to be exposed. Please be cautious hand shaking when taking a picture".

In this instance, if a try button shown in FIG. 18 is touched, as shown in FIG. 19, it may enter a capturing mode and camera setting information is automatically changed to the camera setting information of the template. In order to consistently display the camera setting information 1940 of the selected template 1930 and more quickly change the selected template, if a user 1910 touches and drags a screen in down direction from an upper bezel of the screen, a template drawer 1920 is temporarily displayed. The template drawer 1920 includes not only the selected template but also different templates 1921/1922/1923/1924/1925/1926.

Figure 20:
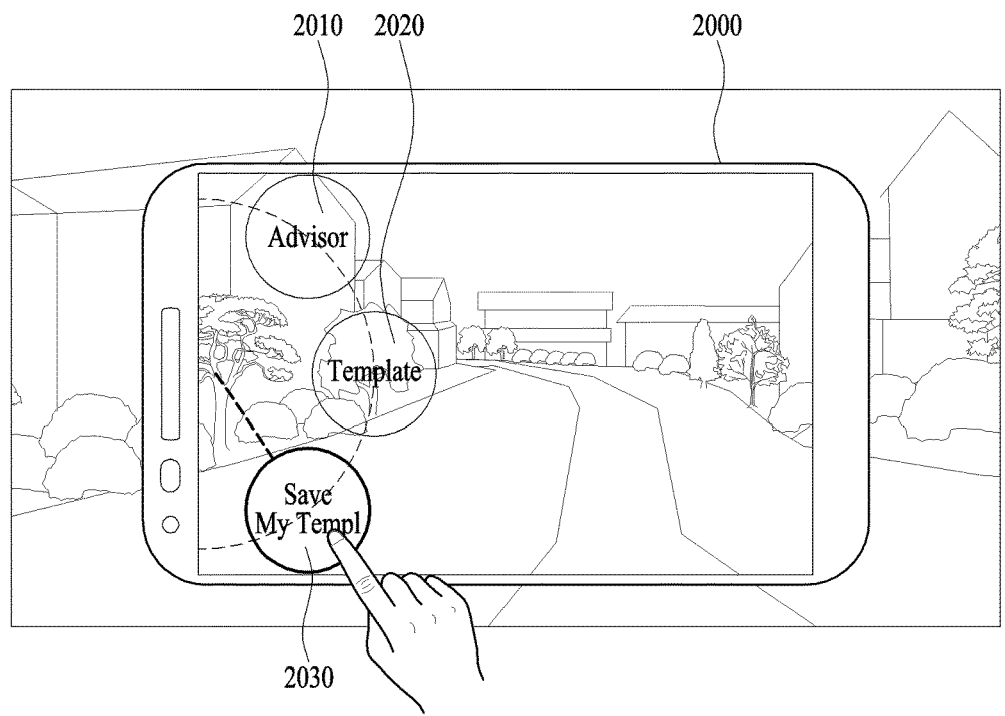
FIGS. 20 and 21 are diagrams illustrating an example of storing a template stored by a mobile device according to one embodiment of the present invention.
Figure 21:
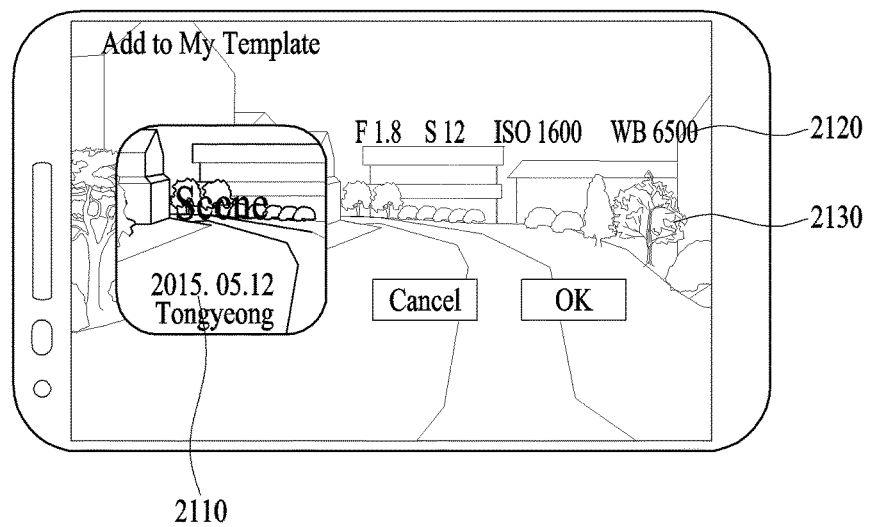

FIGS. 20 and 21 are diagrams illustrating an example of storing a template stored by a mobile device according to one embodiment of the present invention. A method for a user to generate a template is described with reference to FIG. 20 and FIG. 21 in the following. As shown in FIG. 20, a mobile device 2000 provides a user with 3 options 2010/2020/2030. If a last option 2030 is selected, as shown in FIG. 21, the mobile device displays an object for storing a currently captured picture or a picture stored in a memory in advance in a template. A first object 2120 is configured to automatically display camera setting information of a captured picture and a second object 2130 is configured to input a characteristic or a title of a template.

Figure 22:
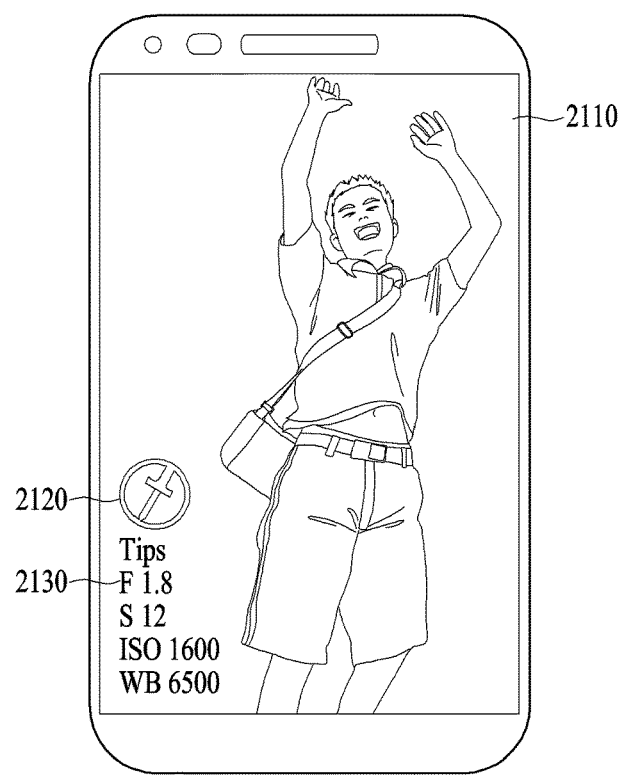
FIGS. 22 to 24 are diagrams illustrating a different example of storing a template stored by a mobile device according to one embodiment of the present invention.
Figure 23:
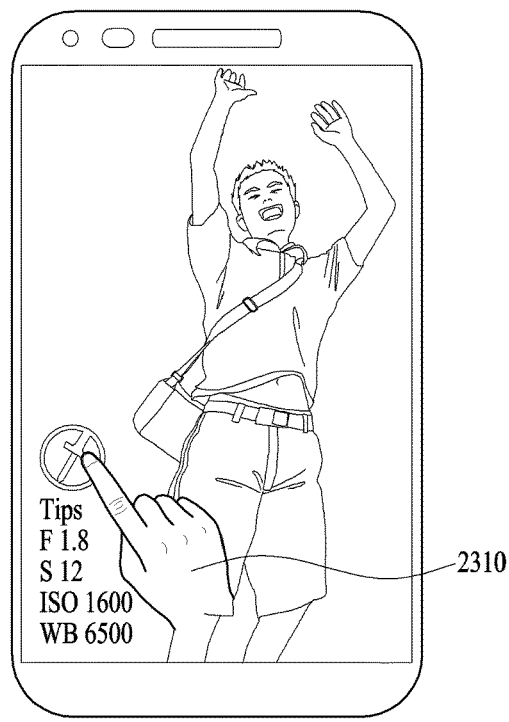
Figure 24:
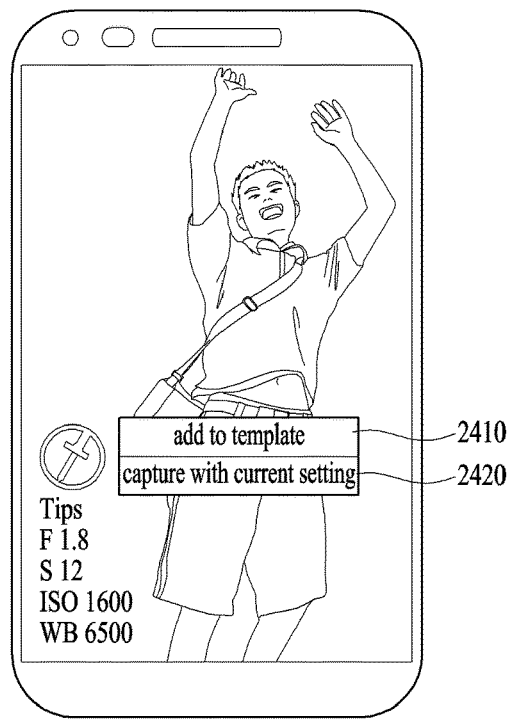

FIGS. 22 to 24 are diagrams illustrating a different example of storing a template stored by a mobile device according to one embodiment of the present invention. As shown in FIG. 22, if a specific picture 2210 includes camera setting information 2230, an indicator 2220 configured to identify the camera setting information is displayed together. As shown in FIG. 23, if a user 2310 selects (e.g., long touch) the indicator, as shown in FIG. 24, two menus are provided to the user. A first menu 2410 provide the user with a function of adding a selected picture to a template and a second menu 2420 provides the user with a function of immediately entering a capturing mode according to camera setting information of the selected picture.

Figure 25:
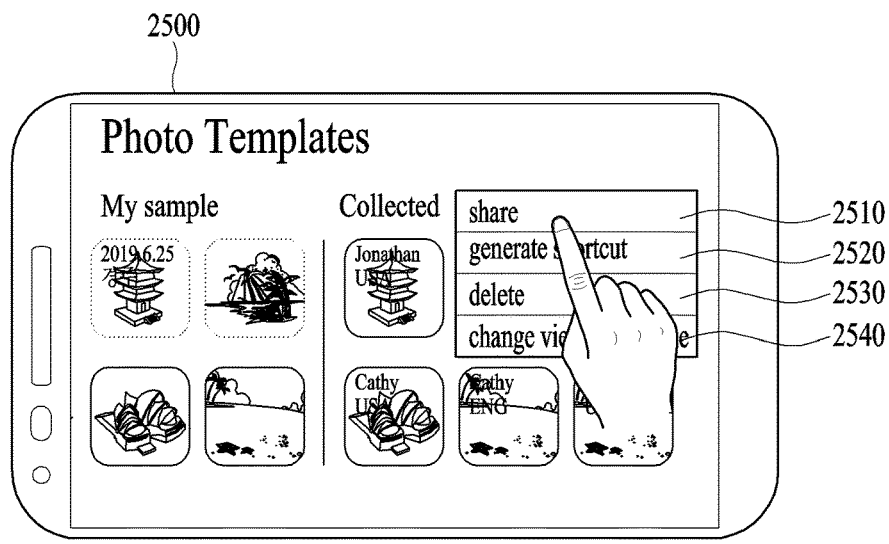
FIGS. 25 and 26 are diagrams illustrating an example of sharing a template shared by a mobile device according to one embodiment of the present invention.
Figure 26:
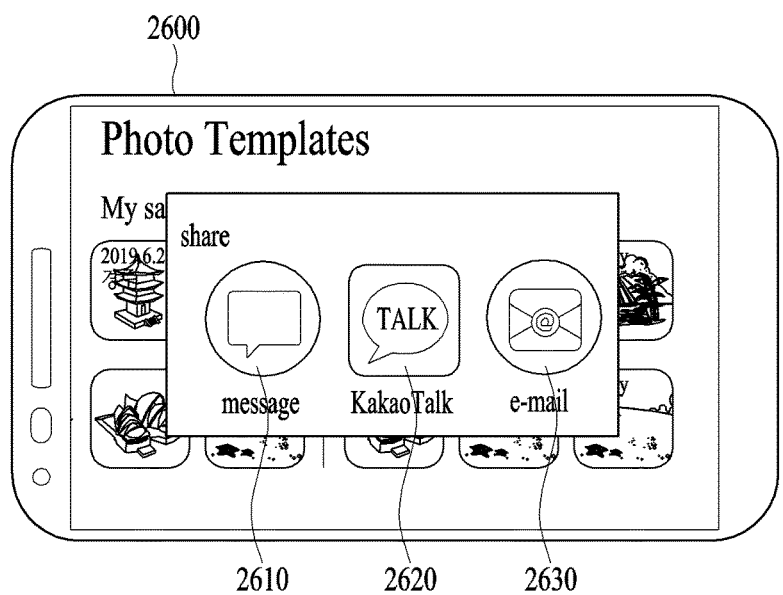

FIGS. 25 and 26 are diagrams illustrating an example of sharing a template shared by a mobile device according to one embodiment of the present invention. In the following, a solution enabling a user to more quickly and easily share a template with other users is explained. As shown in FIG. 25, if a specific template 2500 is selected, 4 menus are provided to a user. A first menu 2510 provide the user with a function of sharing the selected specific template with a different device, a second menu 2520 provides the user with a function (e.g., displaying at home screen) of generating a shortcut for the selected specific template, a third menu 2530 provides the user with a function of deleting the selected specific template and a fourth menu 2540 provides the user with a function of changing a scheme of viewing the selected specific template.

If the first menu 2510 shown in FIG. 25 is selected, as shown in FIG. 26, a plurality of menus for sharing a template with a different device (user) are displayed. A first menu 2610 corresponds to a sharing scheme via a message, a second menu 2620 corresponds to a sharing scheme via SNS and a third menu 2630 corresponds to a sharing scheme via e-mail. If a sharing scheme (e.g., message) is selected, an image of a template and camera setting information are automatically input as a text message. This will be described in the following with reference to FIG. 27 to FIG. 29.

Figure 27:
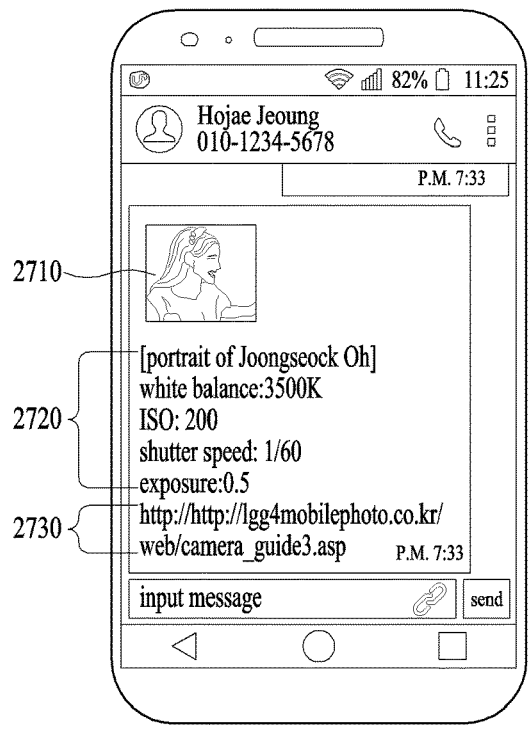
FIGS. 27 to 29 are diagrams illustrating a different example of sharing a template shared by a mobile device according to one embodiment of the present invention.
Figure 28:
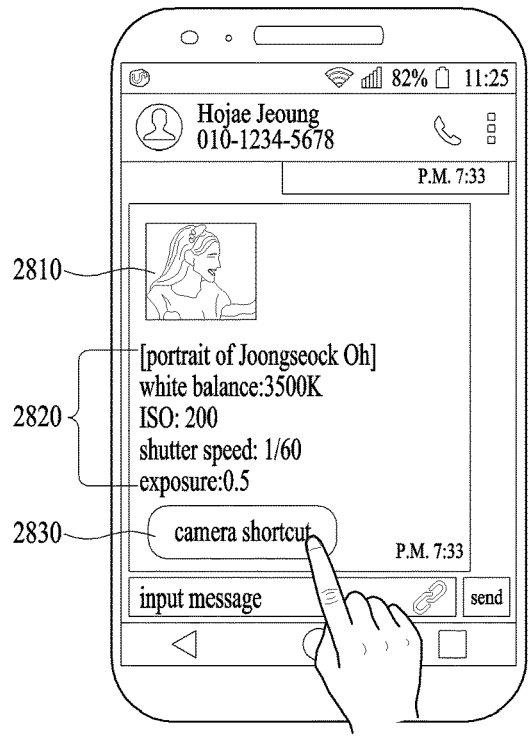
Figure 29:
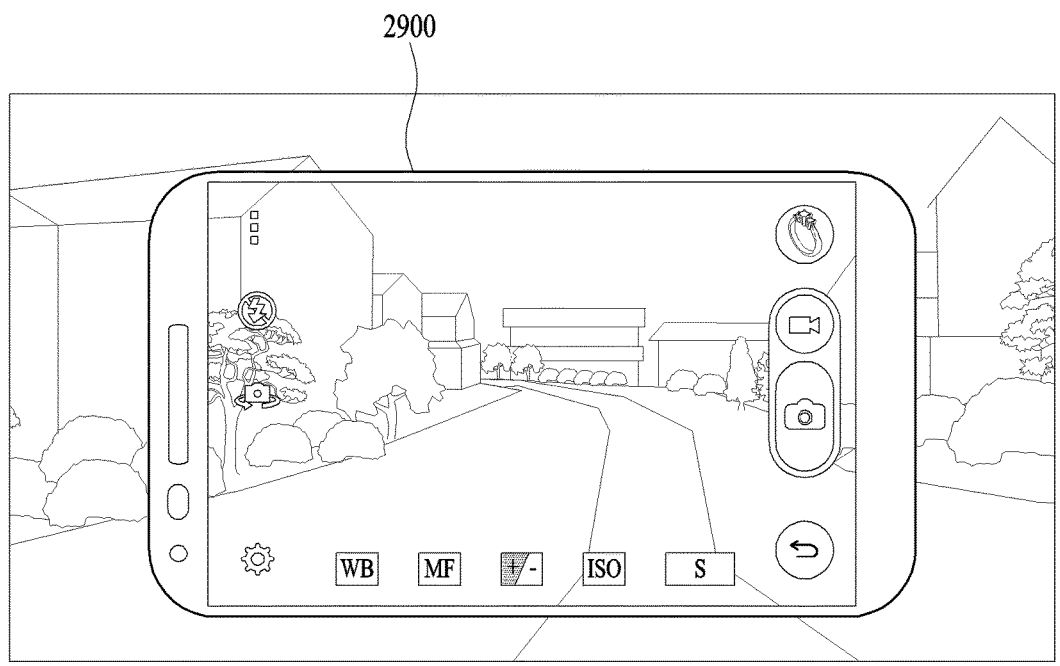

FIGS. 27 to 29 are diagrams illustrating a different example of sharing a template shared by a mobile device according to one embodiment of the present invention. FIG. 27 shows a mobile device to which embodiment of the present invention is not applied, whereas FIG. 28 to FIG. 29 show a mobile device to which the embodiment of the present invention is applied.

If the mobile device to which the embodiment of the present invention is not applied receives a template by a text message, as shown in FIG. 27, an image 2710 of the template, camera setting information 2720 applied to the template, a more specifically guiding message, and URL information 2730 capable of downloading the embodiment of the present invention are displayed.

Meanwhile, if the mobile device to which the embodiment of the present invention is applied receives a template by a text message, as shown in FIG. 28, an image 2810 of the template, camera setting information 2820 applied to the template and a camera shortcut button 2830 are displayed. Hence, the user can take a picture of a style (camera setting information) identical to a style of the template 2810 by simply selecting the button 2830. In particular, it can immediately execute a professional mode. Since both cases are satisfied at the same time, the present invention has an enhanced technical effect compared to a related art in the aspect of compatibility.

Figure 30:
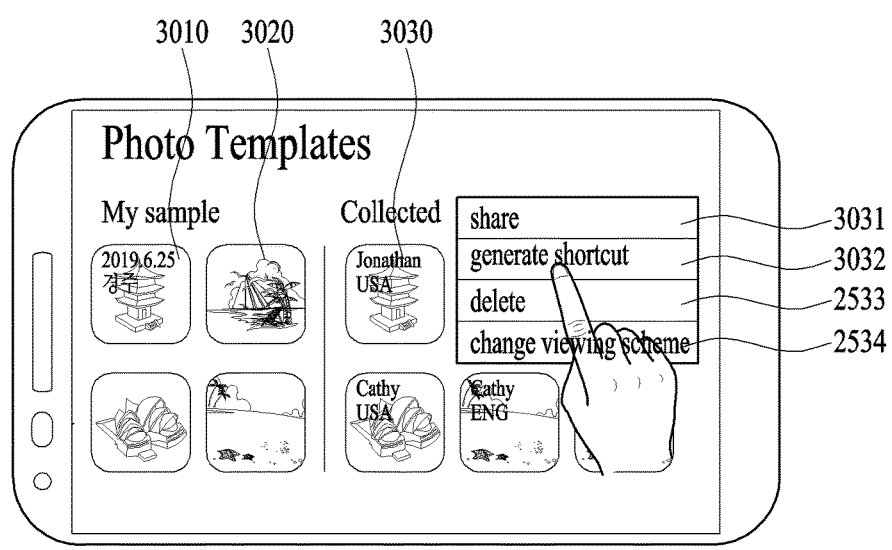
FIGS. 30 to 32 are diagrams illustrating a process of promptly accessing a templet accessed by a mobile device according to one embodiment of the present invention.
Figure 31:
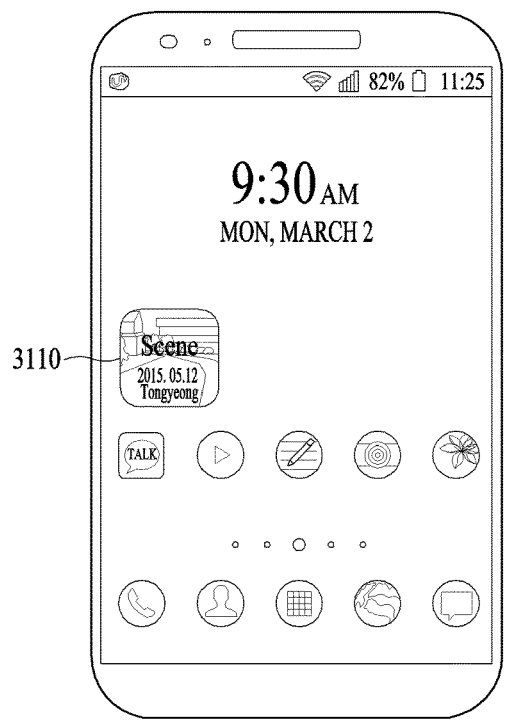
Figure 32:
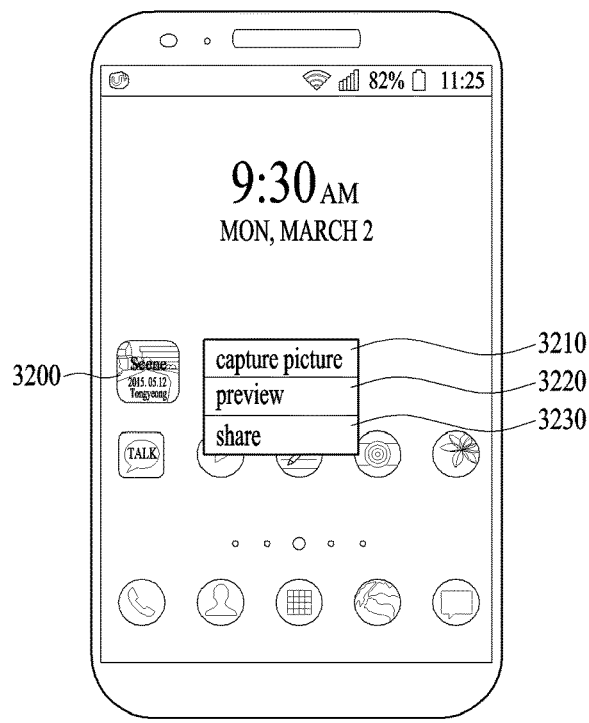

FIGS. 30 to 32 are diagrams illustrating a process of promptly accessing a templet accessed by a mobile device according to one embodiment of the present invention. As shown in FIG. 30, a plurality of templates 3010/3020/3030 are displayed. In this instance, if a specific template 3030 is selected (e.g., long touch), 4 menus 3031/3032/3033/3034 are displayed. If a second menu 3032 is selected, as shown in FIG. 31, the selected specific template 3110 is automatically generated on a home screen. Moreover, if the specific template 3110 positioned at the home screen is selected, as shown in FIG. 32, 3 selectable menus 3210/3220/3230 are displayed in the vicinity of the specific template 3200. A first menu 3210 executes a camera mode while camera setting information identical to camera setting information of the selected specific template is applied. A second menu 3220 provides a user with a preview of the selected specific template. In particular, the selected specific template is displayed on a whole screen. A third menu 3230 provides the user with a function of sharing the camera setting information of the selected specific template with a different device.

Figure 33:
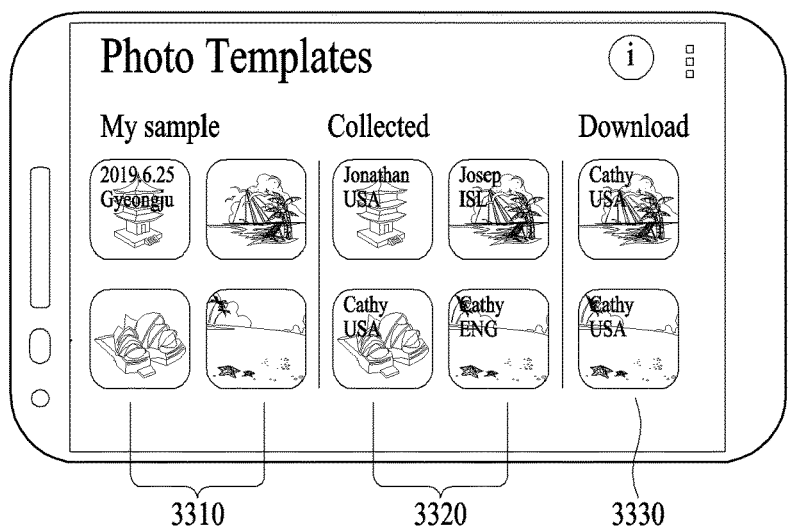
FIGS. 33 and 34 are diagrams illustrating a process of managing a plurality of templets managed by a mobile device according to one embodiment of the present invention.
Figure 34:
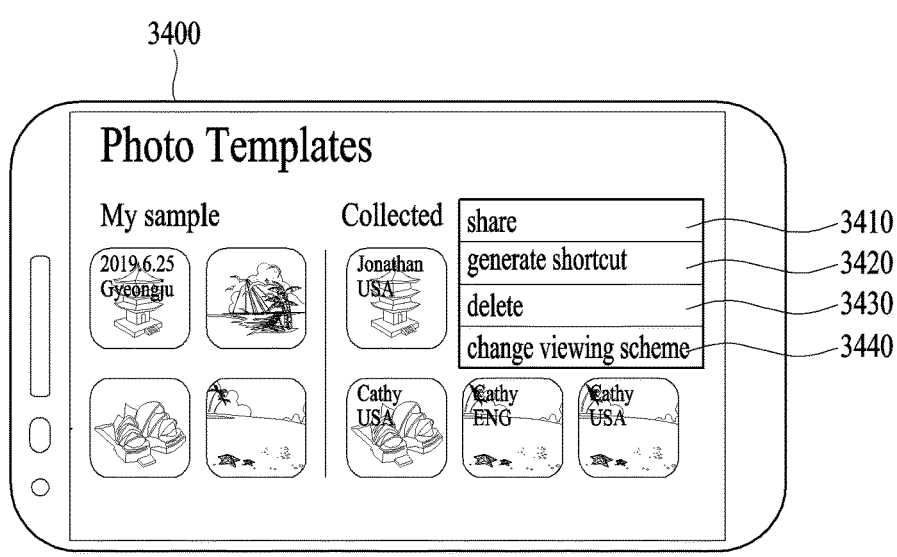

FIGS. 33 and 34 are diagrams illustrating a process of managing a plurality of templets managed by a mobile device according to one embodiment of the present invention. As shown in FIG. 33, templates are displayed by being grouped according to a category. A first group 3310 consists of pictures captured by a user of a mobile device, a second group 3320 consists of pictures received from a user of a different mobile device and a third group 3330 consists of pictures downloaded from a web. The pictures of the third group can be downloaded or shared from a specific web site.

Moreover, as shown in FIG. 34, if a specific template belonging to a random category 3400 is selected, 4 menus 3410/3420/3430/3440 are displayed. The 4 menus are explained in the previous drawings. Yet, if a fourth menu 3440 is selected, it can change an arrangement scheme of the template. For example, the controller can change an arrangement scheme or a grouping scheme based on a person making the template or a category (e.g., food, scenery, person, etc.) of a picture. And, the menus can be applied in a unit of a group (category) to which a template belongs thereto rather than a specific template. This can also be one characteristic of the present invention.

FIGS. 35 to 38 are diagrams illustrating a process of generating a specific mode for camera capturing generated by a mobile device according to one embodiment of the present invention. A method of setting a professional mode by recalling camera setting information on a specific picture of a gallery via a so-called split function is explained in the following.

According to a related art, since a user manually changes a camera setting value all the time, it is difficult for the user to properly utilize a professional mode. According to FIG. 35 to FIG. 38 described in the following, the user can immediately add a picture of a style preferred by the user to a custom mode even in a normal mode.

Figure 35:
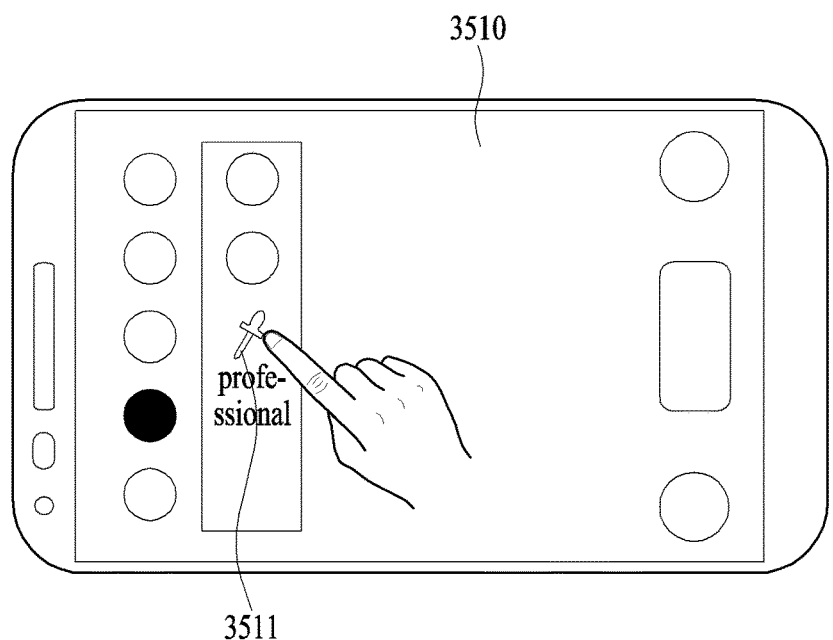
FIGS. 35 to 38 are diagrams illustrating a process of generating a specific mode for camera capturing generated by a mobile device according to one embodiment of the present invention.
Figure 36:
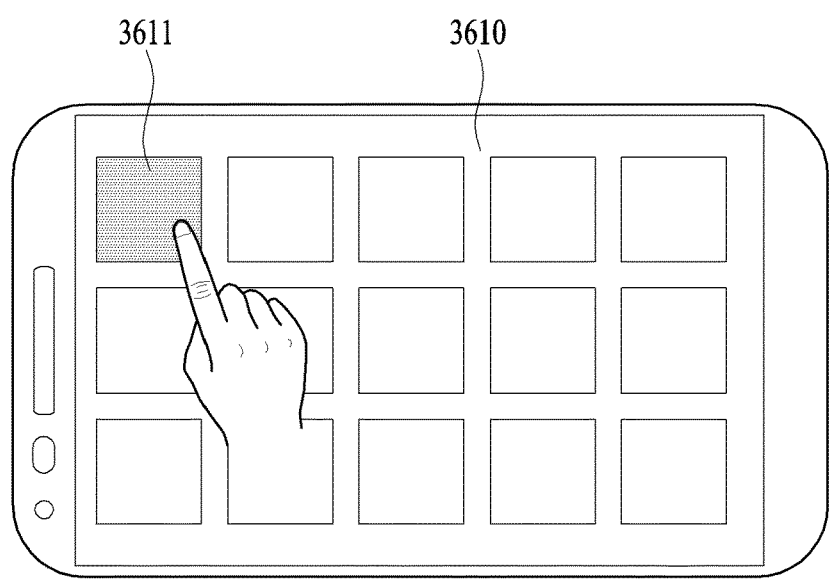
Figure 37:
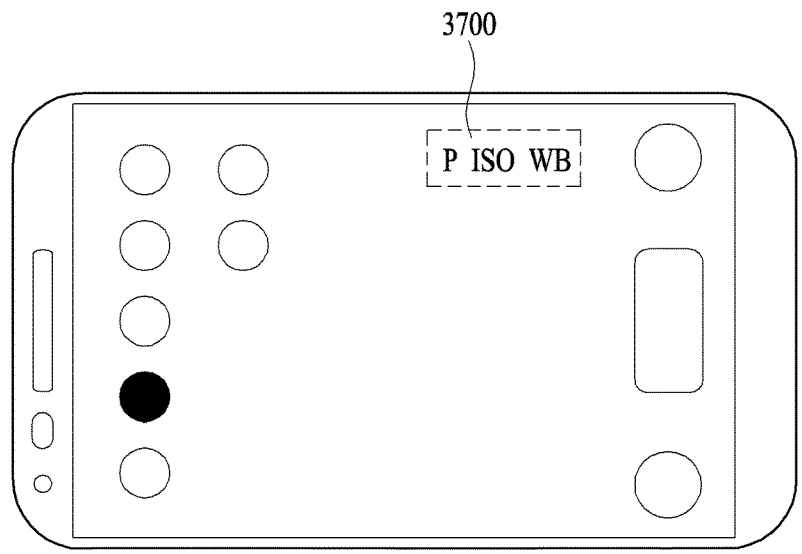
Figure 38:
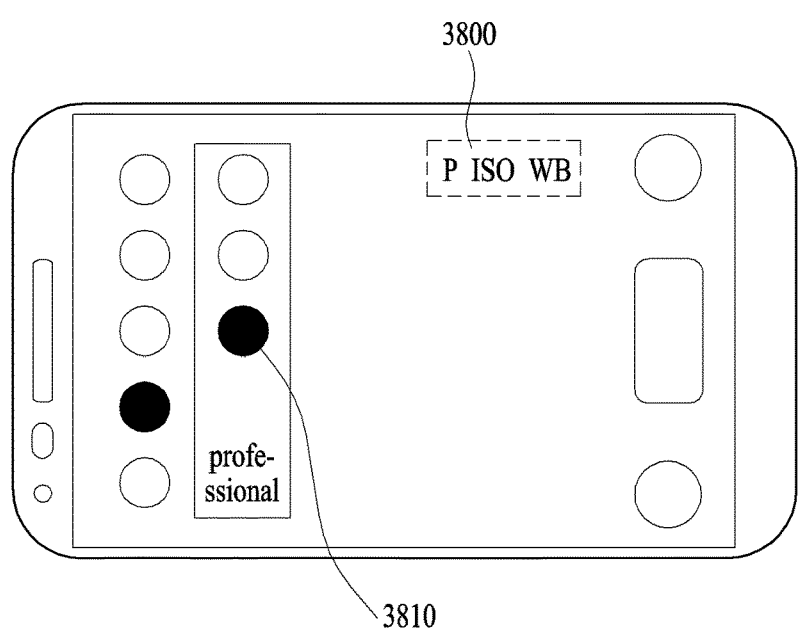

As shown in FIG. 35, when a user selects a specific object 3511 from a preview screen 3510, as shown in FIG. 36, the user enters a gallery 3610 and selects a picture 3611 of a style preferred by the user from the gallery. In this instance, as shown in FIG. 37, camera setting value of the selected picture 3611 is displayed on the top 3700 of a preview screen. Subsequently, as shown in FIG. 38, the camera setting value 3800 and an image 3810 corresponding to the camera setting value are displayed in a new mode. Hence, the user can take a picture of a preview image with the corresponding camera setting value 3800 by simply selecting the image 3810, thereby enhancing speed.

Figure 39:
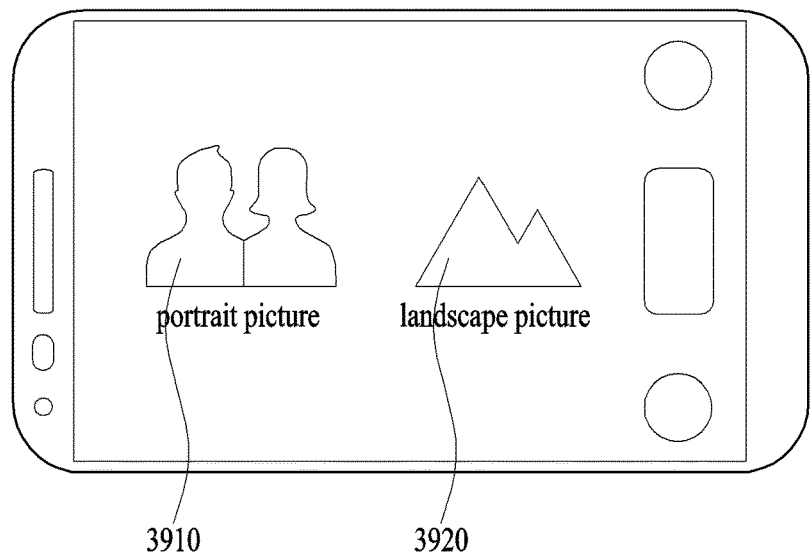
FIGS. 39 to 41 are diagrams illustrating an example of a process of recommending a capturing mode according to location information recommended by a mobile device according to one embodiment of the present invention.
Figure 40:
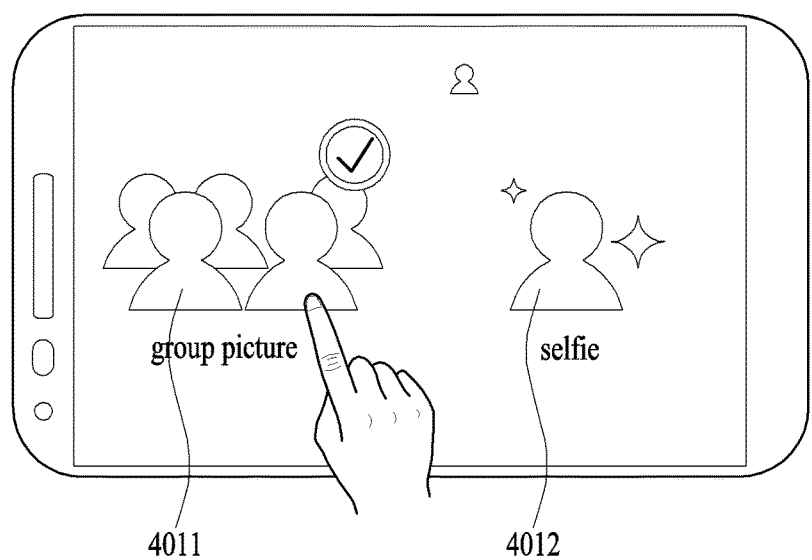
Figure 41:
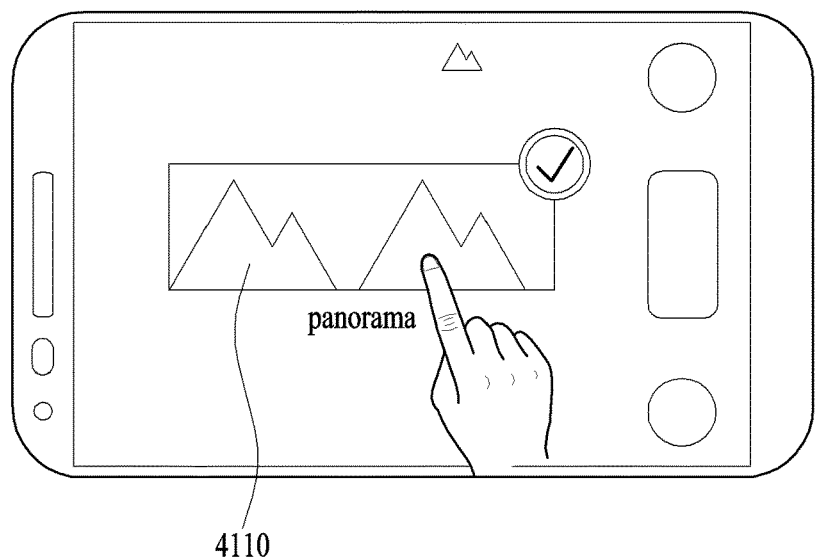

FIGS. 39 to 41 are diagrams illustrating an example of a process of recommending a capturing mode according to location information recommended by a mobile device according to one embodiment of the present invention.

According to a related art, a user should manually change camera setting values according to surrounding environment. Yet, according to one embodiment of the present invention, a camera setting value is automatically changed based on location information (GPS, POI), time information, weather information, schedule information, web information and the like. Relevant information is stored in a memory in advance in a database form. Of course, assume a situation that an automatic recommendation mode or a professional recommendation mode is turned on.

FIG. 39 to FIG. 41 assume that a user of a mobile device is located at the outside of a building. For example, assume that the user executes a camera at Dulle-gil in Jeju Island. First of all, since GPS is smoothly received, the mobile device recognizes it as the user is located at the outside of a building. As shown in FIG. 39, the mobile device provides the user with a screen capable of selecting one of a portrait picture mode 3910 and a landscape picture mode 3920. If the user touches an area except areas of the two modes, picture capturing is initiated in a normal mode. In this instance, the normal mode indicates that picture capturing is performed with an original camera setting value of which a camera setting value is not changed.

Meanwhile, if the portrait picture mode 3910 is selected, a camera setting value is automatically changed to a camera setting value appropriate for the portrait picture mode and then picture capturing is performed. Moreover, as shown in FIG. 40, if one depth is more proceeded, a function capable of selecting either a group picture mode 4011 or a selfie picture mode 4012 is provided. If the group picture mode 4011 is selected, for example, a timer is automatically set.

On the contrary, if the landscape picture mode 3920 is selected, a camera setting value is automatically changed to a camera setting value appropriate for the landscape picture mode and then picture capturing is performed. Moreover, as shown in FIG. 41, a function capable of selecting a panorama mode 4110 can be additionally provided.

Figure 42:
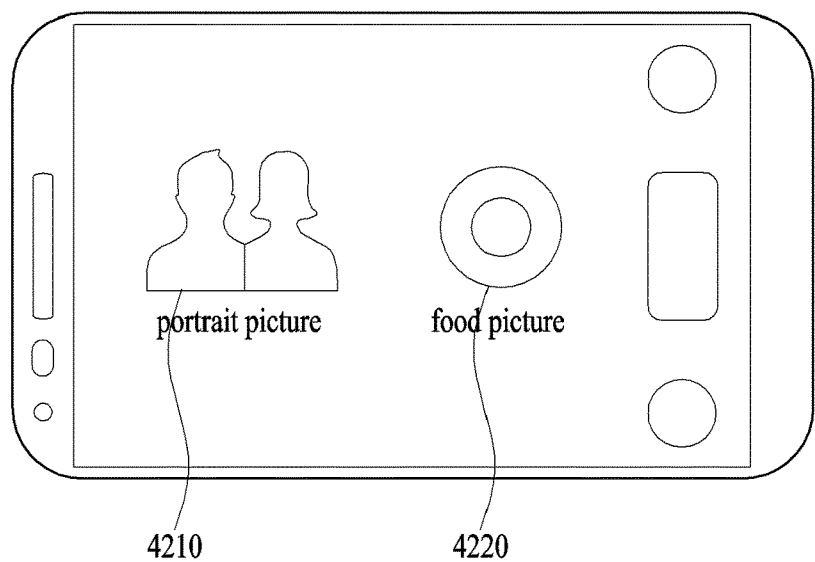
FIGS. 42 and 43 are diagrams illustrating a different example of a process of recommending a capturing mode according to location information recommended by a mobile device according to one embodiment of the present invention.
Figure 43:
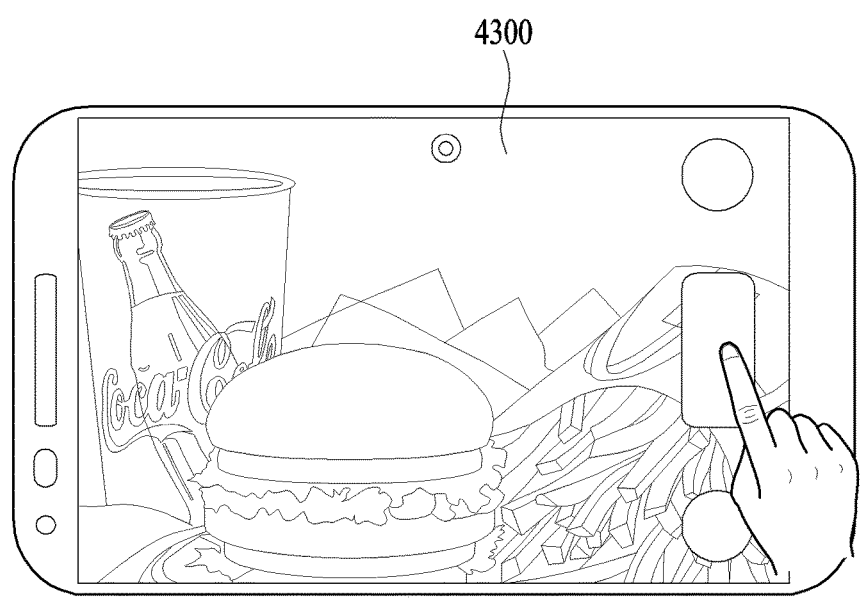

FIGS. 42 and 43 are diagrams illustrating a different example of a process of recommending a capturing mode according to location information recommended by a mobile device according to one embodiment of the present invention. In FIG. 39 to FIG. 41, it is assumed that the user of the mobile device executes the camera while staying at the outside of a building, e.g., at Dulle-gil in Jeju Island. On the contrary, FIG. 42 and FIG. 43 described in the following assume that the user of the mobile device executes the camera while staying at the inside of a building, e.g., at the inside of a restaurant.

For example, since GPS is not smoothly received, the mobile device recognizes it as the user is located at the inside of a building. As shown in FIG. 42, the mobile device provides the user with a screen capable of selecting one of a portrait picture mode 4210 and a food picture mode 4220. Moreover, a camera setting value is automatically changed according to internal lightning of the restaurant and the like recognized by the camera. Meanwhile, since the portrait picture mode is mentioned earlier in the previous drawing, explanation on the portrait picture mode is omitted at this time.

If the food picture mode 4220 is selected, as shown in FIG. 43, a camera setting value is automatically changed to a camera setting value appropriate for the food picture mode and then picture capturing is performed. A preview 4300 corresponds to an example of an image of which the camera setting value is changed to the camera setting value appropriate for the food picture mode.

According to one embodiment of the present invention, the present invention provides a user with a technology capable of easily accessing a camera function of high performance. According to another embodiment of the present invention, the present invention implements simple options for capturing a picture similar to a picture taken by a professional using various GUIs. According to the other embodiment of the present invention, the present invention provides a user with a solution capable of more promptly sharing information on a picture captured by a specific camera setting condition with other users.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A method of controlling a mobile device, the method comprising:
   displaying a preview captured by a camera and at least one or more selectable options on a display of the mobile device;
   selecting a specific option from the at least one or more selectable options;
   changing, via a controller of the mobile device, at least one or more factors among camera setting information according to the selected specific option with reference to a memory;
   storing a specific preview captured based on the changed factor in the memory; and
   transmitting, via a wireless communication processor of the mobile terminal, image data corresponding to the specific preview and the camera setting information used for capturing the specific preview to an external mobile device in response to a command for sharing the specific preview stored in the memory, wherein the selected specific option corresponds to displaying photographs from at least one other photographer at a same location at which the mobile terminal is currently located, and wherein the method further comprises displaying samples of the photographs from the at least one other photographer on the display, and in response to a selection of one of the samples, changing the at least one or more factors among the camera setting information according to setting information of the selected sample.

2. The method of claim 1, wherein in response to a first specific option being selected, the changing of the at least one or more factors comprises:

changing the at least one or more factors according to at least one of location information at which the mobile device is located and weather information; and displaying a first preview captured based on original camera setting information and a second preview captured based on the changed factor.

3. The method of claim 2, wherein the changing of the at least one or more factors comprises:

searching for a professional picture captured based on a factor belonging to a predetermined range of the changed factor, in an internal memory or an external memory of the mobile terminal; and displaying the professional picture.

4. A method of controlling a mobile device, the method comprising:

displaying a preview captured by a camera and at least one or more selectable options on a display of the mobile device;

selecting a specific option from the at least one or more selectable options;

changing, via a controller of the mobile device, at least one or more factors among camera setting information according to the selected specific option with reference to a memory;

storing a specific preview captured based on the changed factor in the memory; and transmitting, via a wireless communication processor of the mobile terminal, image data corresponding to the specific preview and the camera setting information used for capturing the specific preview to an external mobile device in response to a command for sharing the specific preview stored in the memory, wherein in response to a first specific option being selected, the changing of the at least one or more factors comprises:

changing the at least one or more factors according to at least one of location information at which the mobile device is located and weather information; and displaying a first preview captured based on original camera setting information and a second preview captured based on the changed factor, and wherein in response to a second specific option being selected, the changing of the at least one or more factors comprises:

displaying at least one or more templates stored in the memory;

changing the at least one or more factors according to additional information corresponding to a selected specific template; and displaying the first preview captured based on the original camera setting information and the second preview captured based on the changed factor.

5. The method of claim 4, wherein the template is stored in the memory in advance and corresponds to an image data captured according to a user selection.

6. The method of claim 1, wherein the transmitting the image data to the external mobile device includes an option of executing the camera by the external mobile device.

7. The method of claim 6, wherein the transmitting the image data to the external mobile device is performed via one of e-mail, SNS (social network service) and a text message.

8. The method of claim 1, wherein the displaying the at least one or more selectable options includes displaying a different option according to a location at which the mobile device is located.

9. A method of controlling a mobile device, the method comprising:

displaying a preview captured by a camera and at least one or more selectable options on a display of the mobile device;

selecting a specific option from the at least one or more selectable options;

changing, via a controller of the mobile device, at least one or more factors among camera setting information according to the selected specific option with reference to a memory;

storing a specific preview captured based on the changed factor in the memory; and transmitting, via a wireless communication processor of the mobile terminal, image data corresponding to the specific preview and the camera setting information used for capturing the specific preview to an external mobile device in response to a command for sharing the specific preview stored in the memory, wherein the displaying the at least one or more selectable options includes displaying a different option according to a location at which the mobile device is located, wherein the displaying the at least one or more selectable options further comprises:

in response to the mobile device being located inside of a building, displaying a first option and a second option; and in response to the mobile device being located outside of the building, displaying a third option and a fourth option, and wherein at least one of the first and the second options are different from the third and the fourth options.

10. The method of claim 9, further comprising:

determining whether the mobile device is located inside the building or outside the building based on whether or not a GPS (global positioning system) signal is received.

11. A mobile device, comprising:

a camera;

a memory;

a wireless communication processor;

a display configured to display a preview captured by the camera and at least one or more selectable options; and a controller configured to:

change at least one or more factors among camera setting information according to a selected specific option from the at least one or more selectable options with reference to the memory, store a specific preview captured based on the changed factor in the memory, and transmit image data corresponding to the specific preview and the camera setting information used for capturing the specific preview via the wireless communication processor to an external mobile device in response to reception of a command for sharing the specific preview stored in the memory, wherein the selected specific option corresponds to displaying photographs from at least one other photographer at a same location at which the mobile terminal is currently located, and wherein the controller is further configured to display samples of the photographs from the at least one other photographer on the display, and in response to a selection of one of the samples, changing the at least one or more factors among the camera setting information according to setting information of the selected sample.

12. The mobile device of claim 11, wherein in response to a first specific option being selected, the controller is configured to:

change the at least one or more factors according to at least one of location information on a location of the mobile device and weather information, and display a first preview captured based on original camera setting information and a second preview captured based on the changed factor.

13. The mobile device of claim 12, wherein the controller is configured to:

search for a professional picture captured based on a factor belonging to a predetermined range of the changed factor, in an internal memory or an external memory of the mobile device, and display the professional picture.

14. A mobile device, comprising:

a camera;

a memory;

a wireless communication processor;

a display configured to display a preview captured by the camera and at least one or more selectable options; and a controller configured to:

change at least one or more factors among camera setting information according to a selected specific option from the at least one or more selectable options with reference to the memory, store a specific preview captured based on the changed factor in the memory, and transmit image data corresponding to the specific preview and the camera setting information used for capturing the specific preview via the wireless communication processor to an external mobile device in response to reception of a command for sharing the specific preview stored in the memory, wherein in response to a first specific option being selected, the controller is configured to:

change the at least one or more factors according to at least one of location information on a location of the mobile device and weather information, and display a first preview captured based on original camera setting information and a second preview captured based on the changed factor, and wherein in response to a second specific option being selected, the controller is configured to:

display at least one or more templates stored in the memory, change the at least one or more factors according to additional information corresponding to a selected specific template, and display the first preview captured based on original camera setting information and the second preview captured based on the changed factor.

15. The mobile device of claim 14, wherein the template is stored in the memory in advance and corresponds to an image data captured according to a user selection.

16. The mobile device of claim 11, wherein the controller is configured to provide an option of executing the camera by the external mobile device.

17. The mobile device of claim 16, wherein the controller is configured to transmit the image data to the external mobile device via one of e-mail, SNS (social network service) and a text message.

18. The mobile device of claim 11, wherein the controller is configured to display a different option according to a location of the mobile device.

19. A mobile device, comprising:

a camera;

a memory;

a wireless communication processor;

a display configured to display a preview captured by the camera and at least one or more selectable options; and a controller configured to:

change at least one or more factors among camera setting information according to a selected specific option from the at least one or more selectable options with reference to the memory, store a specific preview captured based on the changed factor in the memory, and transmit image data corresponding to the specific preview and the camera setting information used for capturing the specific preview via the wireless communication processor to an external mobile device in response to reception of a command for sharing the specific preview stored in the memory, wherein the controller is configured to display a different option according to a location of the mobile device, wherein in response to the mobile device being located inside of a building, the controller is configured to display a first option and a second option, wherein in response to the mobile device being located outside of the building, the controller is configured to display a third option and a fourth option, and wherein at least one of the first and the second options are different from the third and the fourth options.

20. The mobile device of claim 19, wherein the controller is configured to determine whether the mobile device is located inside of the building or outside of the building based on whether or not a GPS (global positioning system) signal is received.

* * * * *